United States Patent
Katoh

(10) Patent No.: US 6,760,657 B2
(45) Date of Patent: Jul. 6, 2004

(54) ENGINE AIR-FUEL RATIO CONTROL

(75) Inventor: Hiroshi Katoh, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 78 days.

(21) Appl. No.: 10/176,148

(22) Filed: Jun. 21, 2002

(65) Prior Publication Data
US 2003/0065438 A1 Apr. 3, 2003

(30) Foreign Application Priority Data
Jul. 25, 2001 (JP) ........................... 2001-224162

(51) Int. Cl.$^7$ ............................................. B60T 7/12
(52) U.S. Cl. ..................... 701/104; 701/109; 701/115; 73/23.32; 73/117.3; 123/672; 123/479; 123/429
(58) Field of Search ................................. 701/104, 109, 701/114, 115; 123/478, 479, 480, 672, 339.12, 429, 366, 216; 73/117.3, 23.32

(56) References Cited

U.S. PATENT DOCUMENTS

| 5,529,043 A | 6/1996 | Nagaishi et al. |
| 5,544,039 A | 8/1996 | Hiroi |
| 6,014,962 A | 1/2000 | Sato et al. |
| 6,266,605 B1 | 7/2001 | Yasui et al. |
| 6,453,229 B1 * | 9/2002 | Ohkuma et al. ............ 701/109 |
| 6,619,277 B2 * | 9/2003 | Katoh ........................ 123/672 |

FOREIGN PATENT DOCUMENTS

JP      2000-291484      10/2000

OTHER PUBLICATIONS

"Control of Dead Time System", Society of Measurement and Automatic Control, Corona Publishing Company, Jul. 31, 1993.

* cited by examiner

Primary Examiner—Willis R. Wolfe
Assistant Examiner—Johnny H. Hoang
(74) Attorney, Agent, or Firm—Foley & Lardner LLP

(57) ABSTRACT

A fuel injector (5) injects fuel to generate an air-fuel mixture that is burnt in the engine (1), and a sensor (16) detects an air-fuel ratio of the air-fuel mixture from an exhaust gas composition of the engine (1). A controller (11) calculates a dead time representing a lag between the air-fuel ratio variation of the air-fuel mixture and the air-fuel ratio variation detected by the sensor (16), and calculates an estimated state quantity by applying a dead time compensation according to Smith method and a disturbance compensation to the air-fuel ratio detected by the sensor (16). By determining an air-fuel ratio feedback correction amount based on the estimated state quantity applying a sliding mode control process, the response and stability of air-fuel ratio control is improved.

12 Claims, 18 Drawing Sheets

5 FUEL INJECTOR
12 CRANK ANGLE SENSOR
13 ROTATION SPEED SENSOR
14 AIR FLOW METER
15 WATER TEMPERATURE SENSOR
16 UPSTREAM AIR-FUEL RATIO SENSOR
17 DOWNSTREAM AIR-FUEL RATIO SENSOR

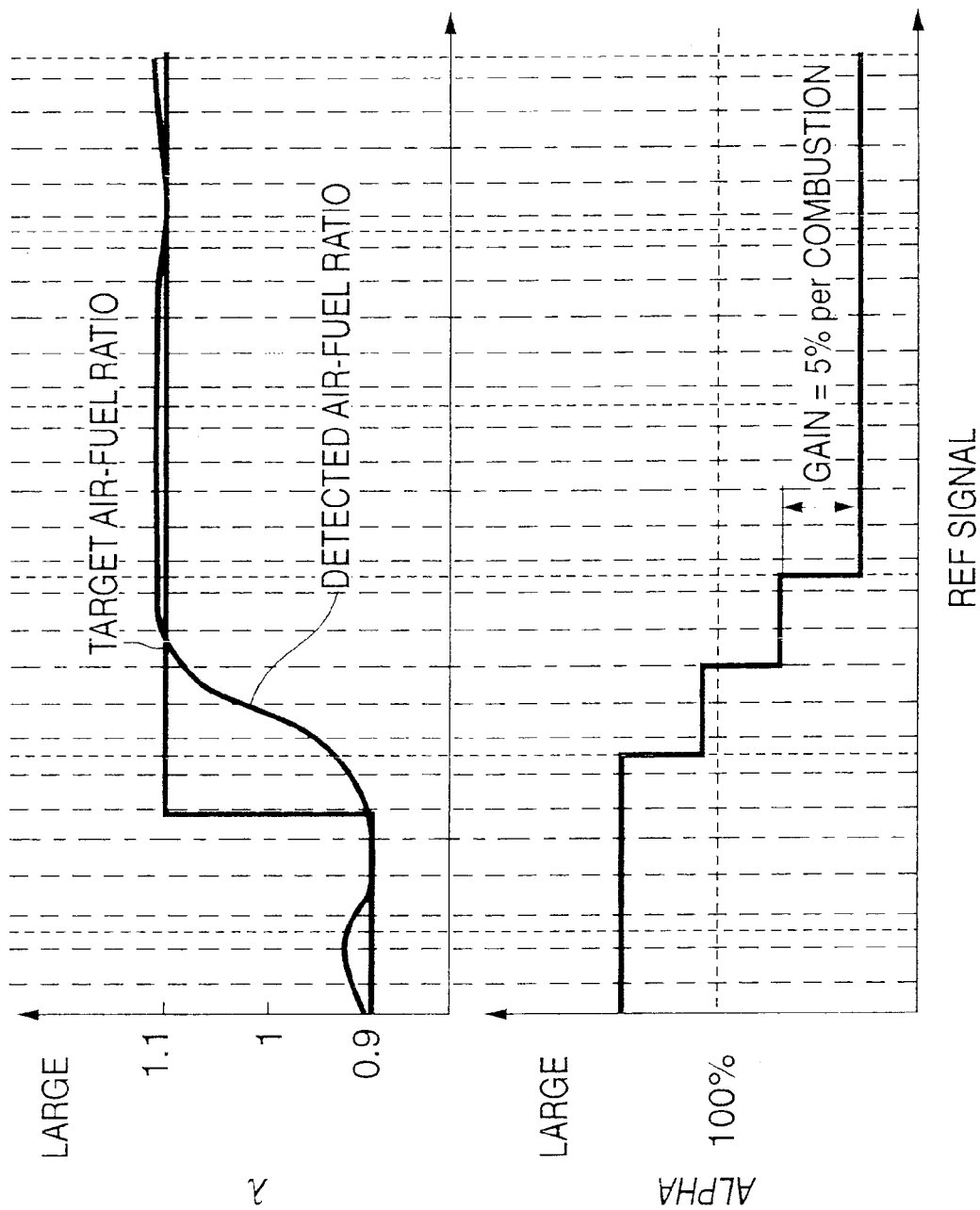

FIG. 19A $d_M$
FIG. 19B $Qc$
FIG. 19C $u(n)$
FIG. 19D $\theta_2(n)$
FIG. 19E $x_2(n)$
FIG. 19F $x_{2M}(n)$
FIG. 19G $\hat{x}_2(n)$

ENGINE AIR-FUEL RATIO CONTROL

FIELD OF THE INVENTION

This invention relates to application of a sliding mode control process to an engine air-fuel ratio control.

BACKGROUND OF THE INVENTION

U.S. Pat. No. 6,266,605 discloses an application of a sliding mode control process to the feedback control of the air-fuel ratio of an air-fuel mixture supplied to an internal combustion engine.

In this prior art technique, an air-fuel ratio sensor is provided upstream and downstream of a catalyst in an exhaust passage, respectively, and calculates an output target value of the upstream air-fuel ratio sensor for which the output of the down-stream air-fuel ratio sensor is a predetermined value by a sliding mode control process.

The fuel injection amount is then feedback controlled by the sliding mode control process so that the output of the upstream air-fuel ratio sensor coincides with the target output value.

The dynamic characteristic of the down-stream air-fuel ratio sensor output relative to the upstream air-fuel ratio sensor output is expressed as a secondary discrete model for feedback control which makes the output of the down-stream air-fuel ratio sensor coincide with a predetermined value. The output of the down-stream air-fuel ratio sensor after a dead time has elapsed is estimated using the model, based on the output of the upstream air-fuel ratio sensor, and the dead time between the outputs of the two sensors is compensated.

SUMMARY OF THE INVENTION

The compensation of the dead time in the prior art technique is limited between the output of the two sensors. No correction is made for the dead time from fuel injection to the output of the upstream air-fuel ratio sensor. Also, the classic proportional integral differential (PID) controller or a self-tuning regulator is applied to the feedback control of the fuel injection amount.

For this reason, if the feedback gain is increased in the low air flowrate region near idle operation of the engine, where there is virtually a large dead time, the air-fuel ratio will tend to oscillate.

It is therefore an object of this invention to stabilize an air-fuel ratio control under sliding mode control with a large feedback gain.

In order to achieve the above object, this invention provides an air-fuel ratio control device for an engine with a combustion chamber for burning a mixture of air and fuel. The device comprises a fuel injector which injects fuel in the engine to generate the mixture, a sensor which detects an air-fuel ratio of the mixture from a composition of exhaust gas of the engine, and a programmable controller.

The programmable controller is programmed to calculate a dead time which represents a lag between the variation of air-fuel ratio of the mixture in the combustion chamber and the variation of air-fuel ratio which is detected by the sensor, calculates an estimated state quantity by applying a dead time compensation according to Smith method and a disturbance compensation to the air-fuel ratio detected by the sensor, calculate an air-fuel ratio feedback correction amount based on the estimated state quantity and a predetermined target air-fuel ratio through a sliding mode control process, and control a fuel injection amount of the fuel injector based on the air-fuel ratio feedback correction amount.

This invention also provides an air-fuel ratio control method for an engine with a combustion chamber for burning a mixture of air and fuel, and a fuel injector which injects fuel in the engine to generate the mixture. The method comprises detecting an air-fuel ratio of the mixture from a composition of exhaust gas of the engine, calculating a dead time which represents a lag between the variation of air-fuel ratio of the mixture in the combustion chamber and the variation of a detected air-fuel ratio, calculating an estimated state quantity by applying a dead time compensation according to Smith method and a disturbance compensation to the detected air-fuel ratio, calculating an air-fuel ratio feedback correction amount based on the estimated state quantity and a predetermined target air-fuel ratio through a sliding mode control process, and controlling a fuel injection amount of the fuel injector based on the air-fuel ratio feedback correction amount.

The details as well as other features and advantages of this invention are set forth in the remainder of the specification and are shown in the accompanying drawings.

BRIEF DESCRIPTION OF THE DRAWINGS

FIGS. 11A and 11B are timing charts showing a variation of the air-fuel ratio feedback correction value ALPHA when the air-fuel ratio in the cylinder is controlled using a variable integration gain in the high rotation-speed region.

DESCRIPTION OF THE PREFERRED EMBODIMENTS

Figure 1:
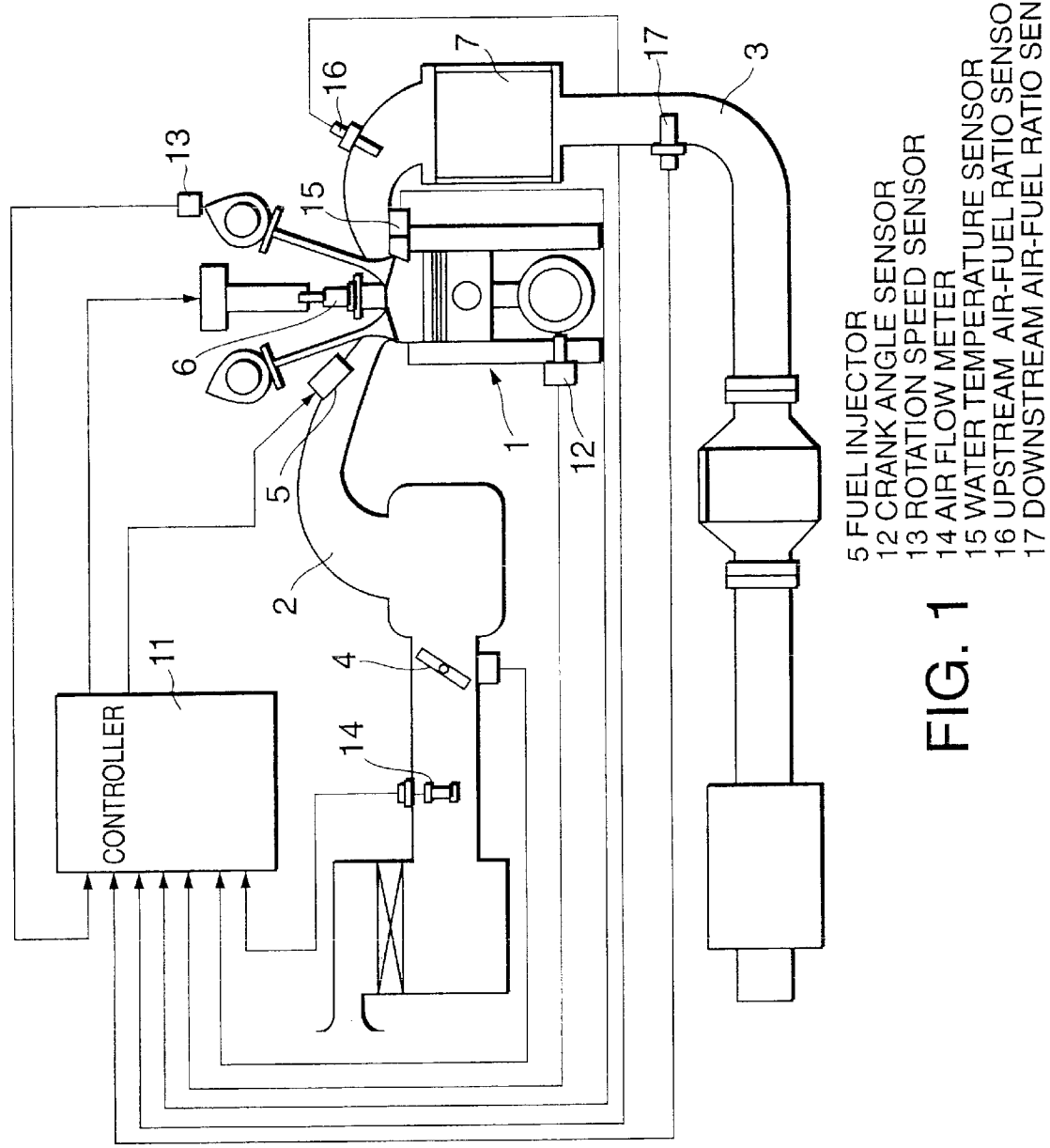
FIG. 1 is a schematic diagram of a gasoline engine to which this invention is applied.

Referring to FIG. 1 of the drawings, a gasoline engine 1 for a vehicle is provided with a combustion chamber 1A, an intake passage 2 and an exhaust passage 3 which are respectively connected to the combustion chamber 1A via valves.

An intake throttle 4 is provided in the intake passage 2.

A catalytic converter 7 which contains a three-way catalyst is provided in the exhaust passage 3.

An air-fuel mixture of fuel and air is supplied to the combustion chamber 1A when a fuel injector 5 injects fuel into the air aspirated by the combustion chamber 1A through the intake passage 2. The air-fuel mixture burns when a spark plug 6 installed in the combustion chamber 1A ignites the air-fuel mixture.

After combustion, exhaust gas is ejected to the exhaust passage 3. The exhaust gas is purified by the catalytic converter 7 and then ejected into the atmosphere.

The three-way catalyst in the catalytic converter 7 is a known catalyst which supports a noble metal such as platinum and rhodium, and an oxygen storage material such as cerium oxide, barium or a base metal on a catalyst support. The three-way catalyst promotes reduction of the nitrogen oxide (NOx) and oxidation of hydrocarbon (HC) and carbon monoxide (CO) in the exhaust gas when the air-fuel mixture burns near the stoichiometric air fuel ratio. It also has an oxygen storage function which stores oxygen contained in the exhaust gas and discharges the stored oxygen as the oxygen concentration in the exhaust gas decreases. In order for the oxygen storage function to function correctly, the air-fuel ratio of the air-fuel mixture burnt in the combustion chamber 1A must be in the proper range.

An air-fuel ratio control of the air-fuel mixture is performed by a programmable controller 11 which regulates a fuel injection amount of the fuel injector 5. The fuel injection timing of the fuel injector 5 and the ignition timing of the spark plug 6 are also controlled by the controller 11.

The controller 11 comprises a microcomputer equipped with a central processing unit (CPU), read-only memory (ROM), random access memory (RAM) and I/O interface (I/O interface). It is also possible to construct the controller from plural microcomputers.

To perform the above control, detection data are input from a rotation speed sensor 13 which detects the rotation speed of the engine 1, a crank angle sensor 12 which detects a predetermined crank angle of the engine 1, an air flow meter 14 which detects an intake air amount of the intake passage 2, a water temperature sensor 15 which detects a cooling water temperature of the engine 1, and upstream and downstream air-fuel ratio sensors 16, 17 which respectively detect the air-fuel ratio of the air-fuel mixture supplied to combustion chamber 1A from the exhaust gas composition.

The upstream air-fuel ratio sensor 16 is disposed upstream of the catalytic converter 7 in the exhaust passage 3, and the down-stream air-fuel ratio sensor 17 is disposed downstream of the catalytic converter 7 in the exhaust passage 3.

The upstream air-fuel ratio sensor 16 comprises a so-called universal exhaust gas oxygen sensor which can detect a variation of the air-fuel ratio of the air-fuel mixture over a wide range from lean to rich.

The downstream air-fuel ratio sensor 17 comprises an oxygen sensor which changes output sharply when the air-fuel ratio of the air-fuel mixture varies beyond the stoichiometric air fuel ratio.

The controller 11 calculates an oxygen storage amount of the three-way catalyst based on the following premise. The noble metal which forms the three-way catalyst stores oxygen at high speed, and the oxygen storage material stores oxygen at low speed.

The oxygen storage material continues storage of oxygen even after the oxygen storage capacity of the noble metals is saturated. In oxygen release, when the proportion of the amount of oxygen release of the noble metal and the amount of oxygen release of oxygen storage material is less than a fixed proportion, oxygen is preferentially released from the noble metal. After the proportion of the release amounts reaches the fixed proportion, oxygen is released from the noble metal and oxygen storage material at the fixed proportion.

The controller 11 performs the air-fuel ratio control of the air-fuel mixture by making the oxygen storage amount of the noble metal, which performs storage and discharge of oxygen at high speed, a parameter. Even when the air-fuel ratio shifts from the stoichiometric air fuel ratio due to this control, the noble metal of the three-way catalyst performs oxygen storage or release at high speed so that the shift is compensated. In this way, the three-way catalyst maintains the oxygen concentration of the exhaust gas at a value corresponding to the stoichiometric air-fuel ratio, and the three-way catalyst shows a high exhaust gas purification capacity.

In the following description, the oxygen storage amount of the three-way catalyst implies the oxygen storage amount of the noble metal.

Now, the controller 11 calculates the oxygen storage amount of the three-way catalyst based on the air-fuel ratio detected by the upstream air-fuel ratio sensor 16.

If the oxygen storage amount exceeds a target storage amount, the air-fuel ratio of the air-fuel mixture supplied to the combustion chamber 1A will be corrected in the rich direction.

Conversely, if the oxygen storage amount is less than the target storage amount, the air-fuel ratio of the air-fuel mixture supplied to the combustion chamber 1A will be corrected in the lean direction.

The controller 11 controls the air-fuel ratio so that the oxygen storage amount is equal to the target storage amount. The control of the air-fuel ratio is materialized by the control of the fuel injection amount of the fuel injector 5.

As an error cumulates in the calculation of the oxygen storage amount in the above air-fuel ratio control process, the control precision deteriorates. Thus, the controller 11 resets the calculated oxygen storage amount to cancel out the error at a timing when the output of the downstream air-fuel ratio sensor 17 changes from rich to lean or vice versa.

Figure 2:
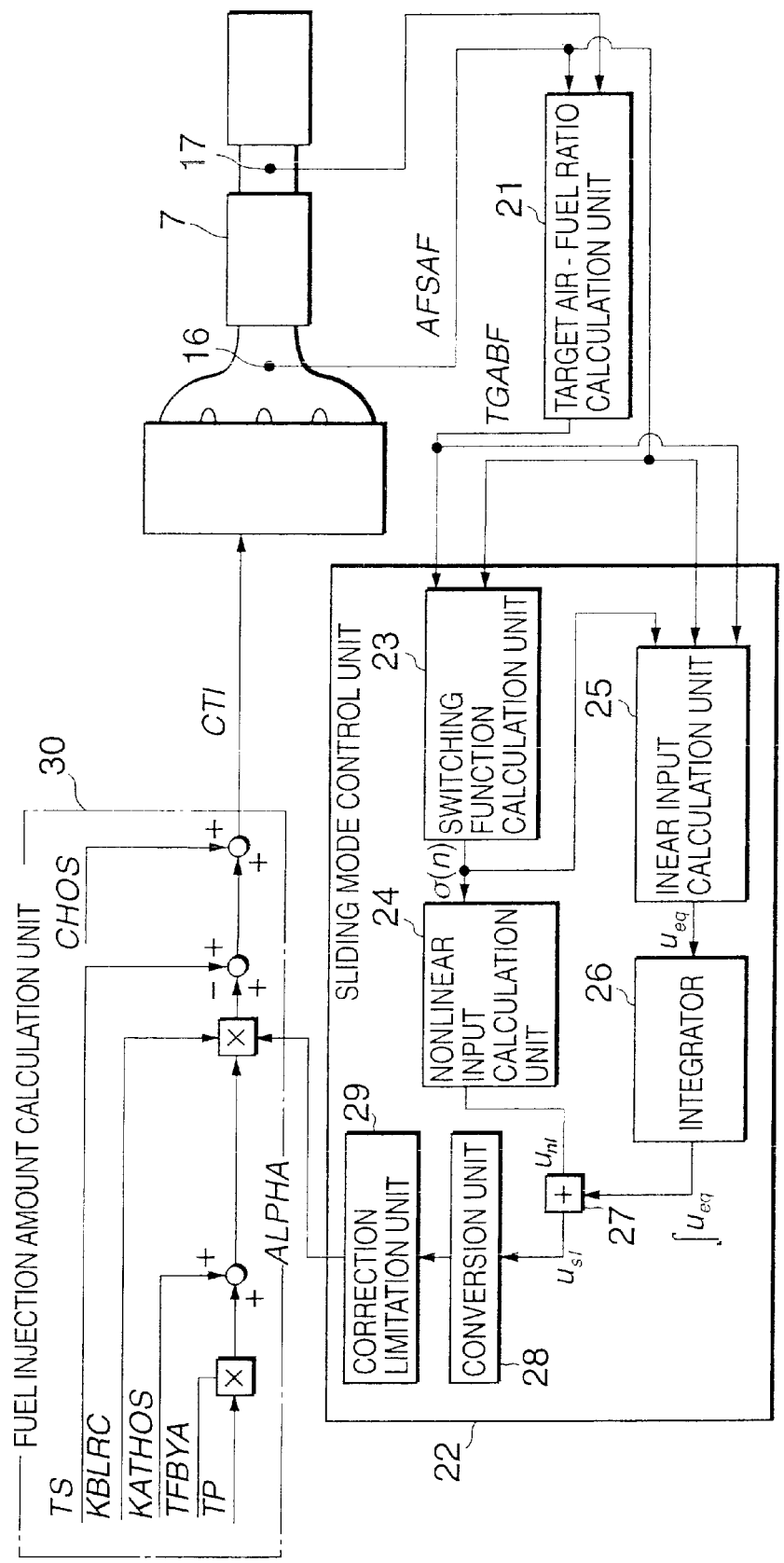
FIG. 2 is a block diagram describing a sliding mode control function of a controller according to this invention.

The controller 11 applies a sliding mode control process to the feedback control of the air-fuel ratio. The function of the controller 11 with respect to the sliding mode control process is shown in FIG. 2.

Referring to FIG. 11, the controller is provided with a target air-fuel ratio calculation unit 21, a sliding mode control unit 22 and fuel injection amount calculation unit 30.

In the following equation (1), the fuel injection amount calculation unit 30 calculates the fuel injection amount of the fuel injector 5. Here, the fuel injection amount is expressed as pulse width CTI of an injection pulse-wave signal output to the fuel injector 5 from the controller 11.

$$CTI = (TP \cdot TFBYA + KATHOS) \cdot (ALPHA + KBLRC - 1) + TS + CHOS \quad (1)$$

where,

TP=basic fuel injection pulse width,

TFBYA=target equivalence ratio,

KATHOS=open-loop correction value of the fuel injection amount,

ALPHA=air-fuel ratio feedback correction value,

KBLRC=air-fuel ratio learning value,

TS=ineffectual injection pulse width, and

CHOS=open-loop correction value of the fuel injection amount per cylinder.

The basic fuel injection amount TP is a value obtained by adding a correction for a transit time of air from the throttle 4 to combustion chamber 1A, to a basic fuel injection pulse width corresponding to the throttle opening determined based on a depression amount of an accelerator pedal with which the vehicle is provided and the rotation speed of the engine 1. The calculation of the basic fuel injection amount TP is known from U.S. Pat. No. 5,529,043.

The sliding mode control unit 22 comprises a switching function calculation unit 23, a nonlinear input calculation unit 24, a linear input calculation unit 25, an integrator 26, an adder 27, a conversion unit 28 and a correction limitation unit 29.

The function of these parts will be described in full detail later.

As mentioned above, although it is well-known to apply a sliding mode control process to the feedback control of air-fuel ratio, this invention is based on a new concept with respect to the application of the sliding mode control process to calculation of the air-fuel ratio feedback correction value ALPHA.

Figure 3:
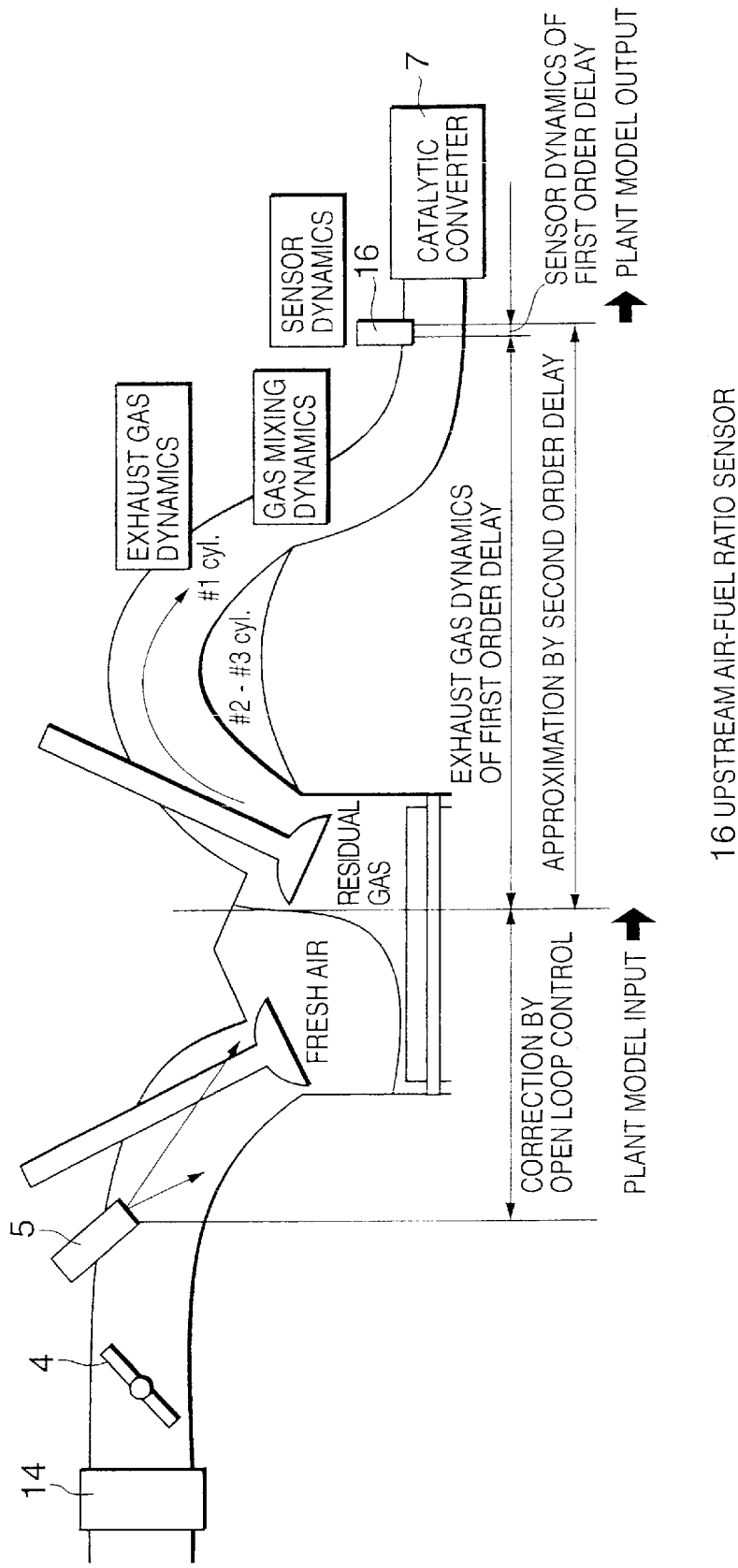
FIG. 3 is a diagram showing an engine physical model for describing a control process according to this invention.

Referring to FIG. 3, it is expected that the air-fuel ratio of the air-fuel mixture supplied to the combustion chamber 1A of the engine 1 will be a target air-fuel ratio due to the open-loop correction values KATHOS and CHOS.

Therefore, the dynamic characteristic of the air-fuel mixture, the dynamic characteristic of exhaust gas and the dynamic characteristic of the upstream air-fuel ratio sensor 16 can be integrated, and can be expressed as a transfer function of a secondary discrete system.

Providing that the input to the engine 1 as a plant is the air-fuel ratio of the air-fuel mixture in the combustion chamber 1A, and the output from the engine 1 is the air-fuel ratio detected by the upstream air-fuel ratio sensor 16, the transfer function Geng(q) of the secondary discrete system except for the dead time may be expressed by the equation (2).

$$Geng(q) = \frac{b_1 \cdot q + b_0}{q^2 + a_1 \cdot q + a_0} \quad (2)$$

where q=dispersion system shift operator, $a_1$, $a_0$=differentiation multipliers, and $b_1$, $b_0$=differentiation multipliers.

Figure 4:
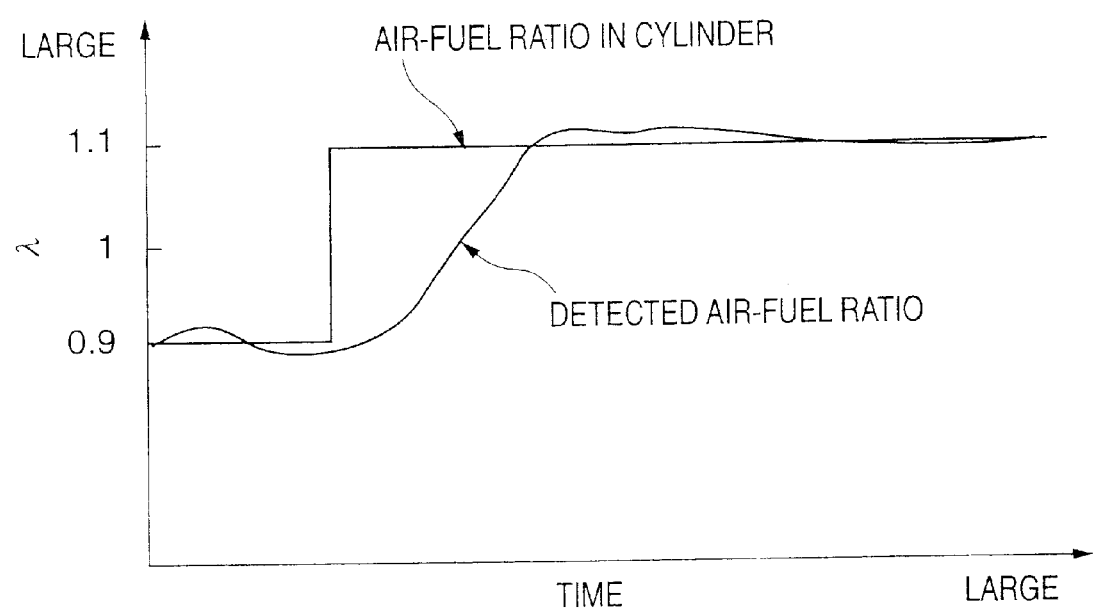
FIG. 4 is a timing chart describing the step response characteristic of the air-fuel ratio variation in a cylinder, and a variation of the air-fuel ratio detected from the exhaust gas composition of the engine.

It is confirmed experimentally that the relation between the above-mentioned input and output of the engine 1 is as shown in FIG. 4. Therefore, the transfer function Geng(q) can be identified by the application of an Auto Regressive with eXogeneous Variable (ARX) model used for modeling a linear time-invariant system.

The system-identification approach using the ARX model is disclosed by Tokkai 2000-291484 published by the Japanese Patent Office in 2000.

It is also possible to identify the transfer function Geng(q) based on the method of least squares.

Even in a plant with a strong nonlinear nature like an engine, the step response of the air-fuel ratio can be measured in every operating region, and a transfer function can be identified for every operating region.

It should be noted that, in the following descriptions, a matrix x(n) will be expressed as mat x(n).

The transfer function Geng(q) of the secondary discrete system is described by the following state equations (3) and (4) representing a state space expression of the secondary discrete system.

$$\text{mat } x(n+1) = \text{mat } A \cdot \text{mat } x(n) + \text{mat } B \cdot u(n) \quad (3)$$

$$= \begin{bmatrix} -a_1 & 1 \\ -a_0 & 0 \end{bmatrix} \cdot \text{mat } x(n) + \begin{bmatrix} b_1 \\ b_0 \end{bmatrix} \cdot u(n)$$

$$\text{mat } y(n) = \text{mat } C \cdot \text{mat } x(n) = [\,1 \quad 0\,] \cdot \text{mat } x(n) \quad (4)$$

where, mat A=system matrix, mat B=input matrix, mat C=output matrix, mat x(n)=state variable, mat y(n)=output u(n)=input, $a_1$, $a_0$=elements of system-matrix mat A, and $b_1$, $b_0$=elements of input matrix mat B.

The elements $a_1$, $a_0$ of the system-matrix mat A are identical to the differentiation multipliers $a_1$, $a_0$ of the equation (2) and the elements $b_1$, $b_0$ of input matrix mat B are identical to the differentiation multipliers $b_1$, $b_0$ of the equation (2).

The input u(n) is the air-fuel ratio of the air-fuel mixture in the combustion chamber 1A calculated from the pulse width CTI of the fuel injection pulse signal, and the output y(n) is the air-fuel ratio detected by the upstream air-fuel ratio sensor 16.

The state variable used in the equation (3) and (4) is expressed by a matrix.

The controller 11 performs control of the air-fuel ratio of the air-fuel mixture in the combustion chamber 1A repeatedly at a fixed interval. The subscript (n) of the equations (3) and (4) denotes a value on the present occasion and the subscript (n+1) denotes a value on the next occasion.

In the general state equations, m is the number of inputs and l is the number of outputs, where, m and l are positive integers. Here, the state equation has two inputs and two outputs, 2a and 2b, which are easy to grasp as physical quantities. Therefore, m=2 and l=2.

The state variable matx(n) is a column vector with two elements $x_1(n)$, $x_2(n)$. The output maty(n) is a column vector with two elements $y_1(n)$, $y_2(n)$. The output matrix mat C is determined such that the system has effectively one output. Specifically, $y_1(n)=x_1(n)$ while $y_2(n)=0$ in the equation (4). The air-fuel ratio AFSAF detected by the upstream air-fuel ratio sensor 16 is adopted as $y_1(n)$.

Summarizing the above relations, the following equations (5) and (6) are obtained.

$$y_1(n)=x_1(n)=\text{AFSAF} \tag{5}$$

$$y_2(n)=0 \tag{6}$$

The elements $a_1$, $a_0$ of the system-matrix mat A and the elements $b_1$, $b_0$ of the input matrix mat B in the equation (3) have been fixed in the process of determining the transfer function of the equation (2).

Consider a servosystem which makes the state variable mat x(n) follow a certain orbit within the state space by applying a sliding mode control process to the system identified by the discrete system. The state amount mat e(n) of the error of the discrete system model is given as the difference between the state amount mat x(n) and a state quantity θ(n) of a target value corresponding to the orbit as shown by the following equation (7).

$$\text{mat } e(n) = \text{mat } x(n) - \text{mat } \theta(n) = \begin{bmatrix} x_1(n) \\ x_2(n) \end{bmatrix} - \begin{bmatrix} \theta_1(n) \\ \theta_2(n) \end{bmatrix} \tag{7}$$

where, e(n)=state quantity of error,

θ(n)=state quantity of target value, $x_1(n)$, $x_2(n)$=elements of state variable x(n), $\theta_1(n)$=target value of $x_1(n)$, and $\theta_2(n)$=target value of $x_2(n)$.

Since $\theta_1(n)$ in the equation (7) is a target value when $x_1(n)$=AFSAF, the target value $\theta_1(n)$ is equal to the target air-fuel ratio TGABF. The controller 11 defines the switching function of the discrete system model by the following equation (8).

$$\sigma(n) = \text{mat } S \cdot \text{mat } e(n) = [S_1 \; S_2] \cdot \text{mat } e(n) \tag{8}$$
$$= S_1 \cdot \{x_1(n) - \theta_1(n)\} + S_2 \cdot \{x_2(n) - \theta_2(n)\}$$
$$= 0$$

where,

σ(n)=state quantity of switching function, mat S=switching function gain, and $S_1$, $S_2$=elements of the switching function gain mat S.

Figure 5:
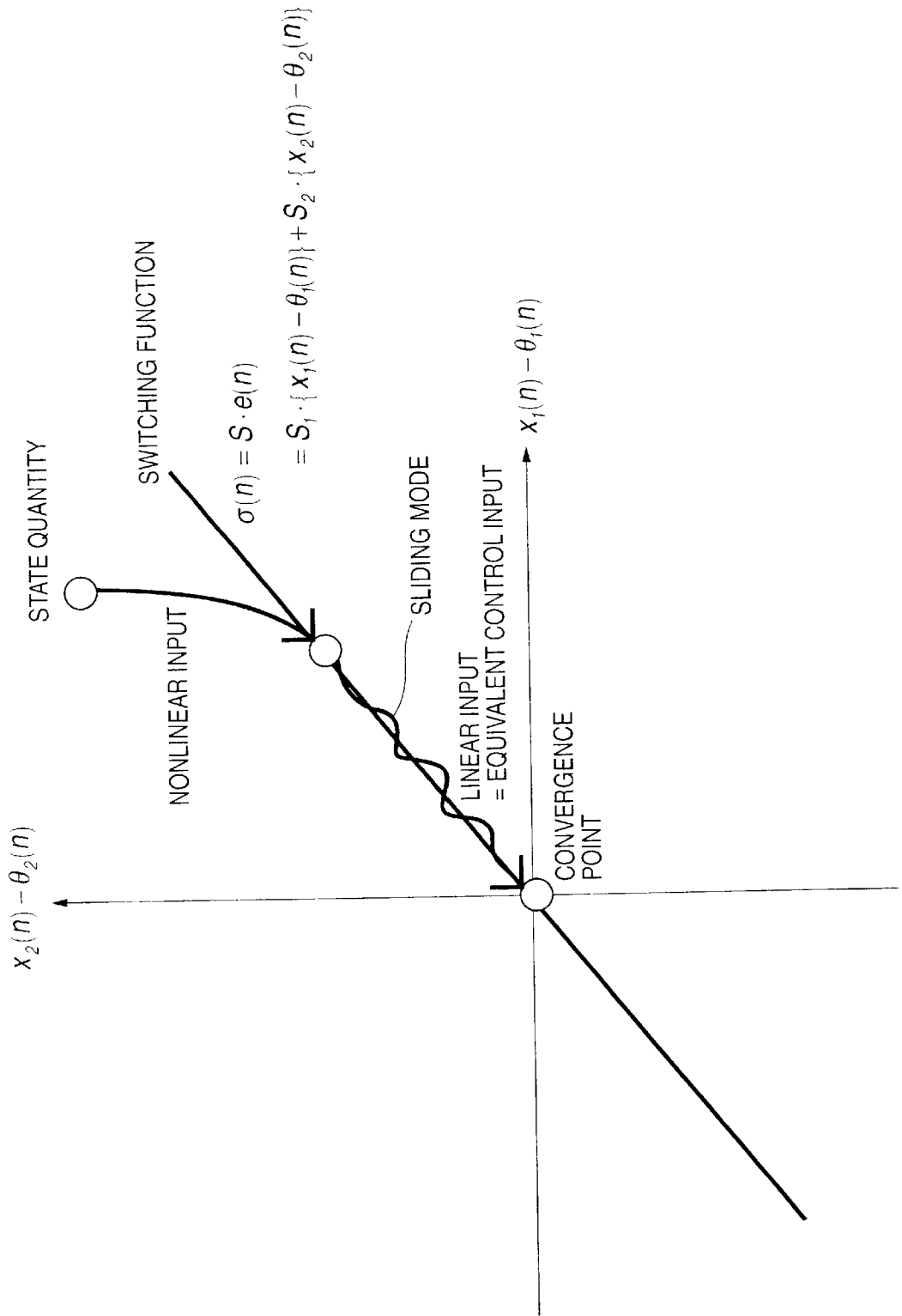
FIG. 5 is a diagram describing a variation of the state quantity of an error in a sliding mode control process according to this invention.

FIG. 5 shows the variation of the state quantity mat e(n) of the error in the sliding mode control process that is indicated on a phase plane.

The state quantity mat e(n) of error is first constrained on the switching function represented by the straight line by the nonlinear input which represents the distance between the state quantity and the switching function in the drawing. Then, the switching function is slid by equivalent control input which is linear input, and it converges to the origin of the phase plane. In this way, the state variable mat x(n) can be made to converge to the state amount mat θ(n) of the target value. When $S_2$ is fixed, if $S_1$, which is an element of the switching function gain mat S, is increased, the slope of the line will increase. In other words, the control gain increases.

As there are two elements of the state variable mat x(n), the switching function is expressed as a straight line, and is physically easy to grasp on the phase plane, but if there are three elements in the state variable mat x(n), the switching function will be a flat surface on the phase plane, and if the number of elements increases further, the switching function will be a super-flat surface.

Next, a method of calculating the control input of linear input and nonlinear input will be described. In a continuous system with sliding mode conditions, $\sigma=0$ and $\dot{\sigma}=0$ hold.

Here, the differential value of σ is shown as $\dot{\sigma}$. On the other hand, sliding mode conditions in a discrete system are expressed by the following equations (9) and (10).

$$\sigma(n)=0 \tag{9}$$

$$\Delta\sigma(n+1)=\sigma(n+1)-\sigma(n)=0 \tag{10}$$

Equation (10) is rewritten as the following equation (11).

$$\Delta\sigma(n+1) = \sigma(n+1) - \sigma(n) \tag{11}$$
$$= \text{mat } S \cdot \{\text{mat } x(n+1) - \text{mat } \theta(n+1)\} - \sigma(n)$$
$$= \text{mat } S \cdot \{\text{mat } A \cdot \text{mat } x(n) + \text{mat } B \cdot u_{eq}(n) -$$
$$v \; \theta(n+1)\} - (n)$$

If det (mat S·mat B)$^{-1} \neq 0$ in the equation (6), linear input, i.e., equivalent control input, is expressed by the following equation (12), where det expresses determinant.

$$\text{mat } u_{eq}(n) = -(\text{mat } S \cdot \text{mat } B)^{-1} \cdot \text{mat } S \cdot \tag{12}$$
$$\{\text{mat } A \cdot \text{mat } x(n) - \text{mat } \theta(n+1)\} - \sigma(n)$$

By rewriting the equation (12) using scalar values obtained from the equations (3) and (4), the following equation (13) will be obtained.

$$u_{eq}(n) = (S_1 \cdot b_1 + S_2 \cdot b_0)^{-1} \cdot \left(a_1 \cdot S_1 + a_0 \cdot S_2 + \frac{S_1^2}{S_2}\right) \cdot \{x_1(n) - \theta_1(n)\} \tag{13}$$

Next, a nonlinear input will be described. Nonlinear input can be applied arbitrarily.

Although the nonlinear input can be expressed as one function including a compensation for the disturbance, in this control system, the nonlinear input is divided into a portion β(n) for the disturbance and a portion α(n) for the other elements. As a result, the following equation (14) is obtained.

$$u_{nl}(n)=\{\alpha(n)+\beta(n)\} \cdot sgn[\sigma(n)] \tag{14}$$

where,

β(n)>Hmax,

α(n), β(n)=positive scalar value function, and

Hmax=maximum estimated value of disturbance.

sgn[σ(n)] of the equation (14) expresses a sign function. According to this function, when the state amount σ(n)>0, sgn[σ(n)]=1, and when the state quantity σ(n)<0, sgn[σ(n)]=−1. The sign function is necessary so that, for example, when the state quantity mat e(n) of the error crosses the line of the switching function in FIG. 5 towards the lower side, the nonlinear input returns the state amount of the error towards the upper side beyond the switching function on the next occasion when the control is performed.

The conditions of the nonlinear input to prevent so called chattering of the result are expressed by the following relations (15) and (16).

(i) In the case of state amount σ(n)>0:

$$0 \leq \sigma(n+1) \leq \sigma(n) \quad (15)$$

(ii) In the case of state amount σ(n)<0:

$$\sigma(n) \leq \sigma(n+1) \leq 0 \quad (16)$$

Relation (15) means that the state amount of the error is closer to zero, which is the convergence point, on the next occasion (n+1) than on the present control occasion (n).

The scalar value function α(n) which satisfies the conditional relation (15) is calculated using the following equation (17) which is derived from the equation (8).

$$\sigma(n+1) = \text{mat } S \cdot \text{mat } e(n+1) \quad (17)$$

When the state amount σ(n)=mat S mat e(n) in the system expressed by the state equations (3) and (4), the input which satisfies the relation of σ(n)=σ(n+1)=σ(n+2) is the linear input calculated by the equation (13). The equation (17) in this case is expressed by the following equation (18).

$$\begin{aligned}\sigma(n+1) &= \text{mat } S \cdot \{\text{mat } x(n+1) - \text{mat } \theta(n+1)\} \\ &= \text{mat } S \cdot [\text{mat } A \cdot \text{mat } x(n) + \text{mat } B \cdot \\ &\quad \{u_{nl}(n) + u_{eq}(n)\} - \text{mat } A \cdot \text{mat } \theta(n)] \\ &= \alpha(n) + \text{mat } S \cdot \text{mat } B \cdot u_{nl}(n)\end{aligned} \quad (18)$$

From the equation (18), the conditions which satisfy the equation (15) are expressed by the following equation (19).

$$\|\text{mat } S \cdot \text{mat } B\| \cdot \alpha(n) \leq \|\alpha(n)\| \quad (19)$$

From the equation (19), the scalar value function α(n) which satisfies the equation (15) is expressed by the following equation (20).

$$\alpha(n) = \eta \cdot \|\text{mat } S \cdot \text{mat } B\|^{-1} \cdot \|\sigma(n)\| \quad (20)$$

where,

η=nonlinear gain (0<η<1), and

σ(n+1)>σ(n)>0.

Therefore, the nonlinear input $u_{nl}(n)$ is expressed by the following equation (21).

$$\begin{aligned}u_{nl}(n) &= \{\eta \cdot \|\text{mat } S \cdot \text{mat } B\|^{-1} \cdot \|\sigma(n)\| + \beta(n)\} \cdot sgn[\sigma(n)] \\ &= \{\eta \cdot |S_1 \cdot b_1 + S_2 \cdot b_0|^{-1} \cdot |\sigma(n)| + |\beta(n)|\} \cdot sgn[\sigma(n)]\end{aligned} \quad (21)$$

where,

0<η<1 and σ(n+1) σ(n)>0.

The equation (21) prevents chattering while providing robust air-fuel ratio control to external disturbance.

Thus, after calculating the linear input $u_{eq}(n)$ by the equation (13) and calculating the nonlinear input $u_{nl}(n)$ by the equation (21), the air-fuel ratio control input $u_{sl}(n)$ which is the total control input is calculated by the following equation (22).

$$u_{sl}(n) = \kappa \cdot \int u_{eq}(n) dt + u_{nl}(n) \quad (22)$$

where,

κ=integration gain.

The first term on the right-hand side of the equation (22) integrates the linear input $u_{eq}(n)$. The integrator 26 shown in FIG. 2 is provided for this purpose.

The objective of the integrator 26 is to improve convergence to the target air-fuel ratio which is variable, and to absorb the steady-state deviation.

Figure 6:
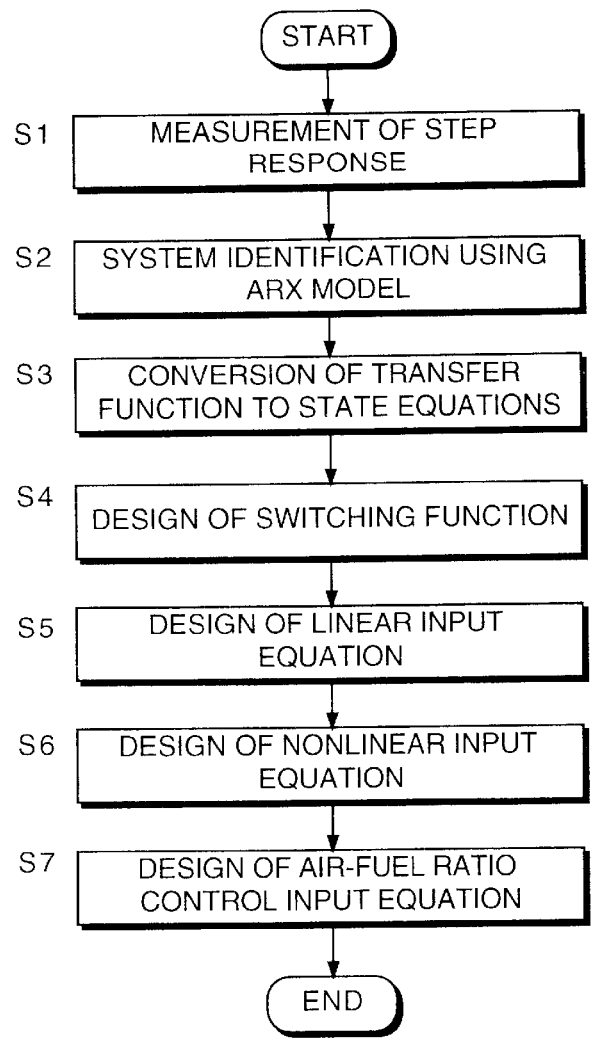
FIG. 6 is a diagram describing the design process of various functions and equations required for the sliding mode control process according to this invention.

Next, referring to FIG. 6, the design flow of the sliding mode control process in the development stage of the air-fuel ratio controller will be described.

First, in a step S1, the step response of the air-fuel ratio detected by the upstream air-fuel ratio sensor 16 with respect to the air-fuel ratio in the combustion chamber 1A is measured, and the results shown in FIG. 4 are for example obtained. The step response measurement is performed for various cylinder intake air amounts Qc of the engine 1 calculated from the output signal of the air flow meter 14.

Next, in a step S2, the second order transfer function Geng(q) of the discrete system is identified using an ARX model or the method of least squares. As a result of the identification, the elements $a_1$, $a_0$ of the system matrix mat A and the elements $b_1$, $b_0$ of the input matrix mat B are determined according to the intake air amount Qc. Next, in a step S3, the transfer function Geng(q) is converted to the state equations of the secondary discrete system expressed by the equations (3), (4).

Next, in a step S4, the switching function σ(n)=0 is designed.

In subsequent steps S5, S6, S7, the equation (13) for calculating the linear input $u_{eq}(n)$, the equation (21) for calculating the nonlinear input $u_{nl}(n)$, and the equation (22) for calculating the air-fuel ratio control input $u_{sl}(n)$, are designed, respectively.

Next, the difference between the sliding mode control process according to this invention and the sliding mode control process applied by the above-mentioned prior U.S. Pat. No. 6,266,605 will be described.

A canonical system expressed by the next equation (23) will be taken as an example.

$$\frac{d}{dt}\begin{bmatrix}x_1 \\ x_2\end{bmatrix} = \begin{bmatrix}A_{11} & A_{12} \\ A_{21} & A_{22}\end{bmatrix} \cdot \begin{bmatrix}x_1 \\ x_2\end{bmatrix} + \begin{bmatrix}0 \\ B_2\end{bmatrix} \cdot u \quad (23)$$

where, $x_1 \in R^{n-m}$, and $x_2 \in R^m$.

In the prior art example, an extension field shown by the following equation (24) which adds a value z which is an integration of the difference of a target value θr and the output θy to the state variable is used.

$$\frac{d}{dt}\begin{bmatrix}z \\ x_1 \\ x_2\end{bmatrix} = \begin{bmatrix}0 & -C & 0 \\ 0 & A_{11} & A_{12} \\ 0 & A_{21} & A_{22}\end{bmatrix} \cdot \begin{bmatrix}z \\ x_1 \\ x_2\end{bmatrix} + \begin{bmatrix}0 \\ 0 \\ B_2\end{bmatrix} \cdot u + \begin{bmatrix}1 \\ 0 \\ 0\end{bmatrix} \cdot \theta r \quad (24)$$

where, $A \in R^{n \cdot m}$, $x \in R^n$, $B \in R^{n \cdot m}$, and $$z = \int_0^t (\theta r - \theta y) dt \qquad (5)$$

In the extension field, the switching function is defined by the following equation (25).

$$\sigma(n) = \text{mat } S \cdot \text{mat } x = S_1 \cdot z + S_2 \cdot x_1 + x_2 = 0 \qquad (25)$$

In the above-mentioned extension field, as the integral term z exists in the equation (25), the operation of the nonlinear input equation (21) which originally assures response when there is a state change becomes slow, and the robustness to disturbances is also low.

In this invention, by giving an integration term to the linear input as in the equation (22), rapid convergence to the target air-fuel ratio is achieved without reducing the response even in the case where an extension field is used.

Next, a routine for calculating the air-fuel ratio feedback correction value ALPHA performed by the controller 11 will be described referring to FIG. 7.

This routine is performed at an interval of ten milliseconds when the engine 1 is operated by considering the stoichiometric air fuel ratio as the target air-fuel ratio. Alternatively, it may be performed at a predetermined crank angle detected by the crank angle sensor 12.

This routine corresponds to the function of the sliding mode control unit 22 of FIG. 2.

In a first step S11, the controller 11 reads the target air-fuel ratio TGABF, and in a following step S12, reads the real air-fuel ratio AFSAF.

In a following step S13, the state amounts $x_1$, $x_2$ are calculated. From the equation (4), $y_1 = x_1$ and $y_2 = 0$ are satisfied. $y_1$ is the air-fuel ratio AFSAF detected by the upstream air-fuel ratio sensor 16. The equation (23) denotes simultaneous equations with two variables, $[x_1, x_2]$. If this is solved for the state amounts $x_1$, $x_2$, $x_2$ can be calculated as a function of $x_1$. Then, $x_2$ can be calculated if the detected air-fuel ratio AFSAF is substituted for $x_1$.

In a following step S14, the switching function $\sigma(n)=0$ is calculated using the state variable mat x(n), the state amount θ of the target value, and the switching function gain mat S. The processing of the step S14 corresponds to the function of the switching function calculation unit 23 of FIG. 2.

In a following step S15, the nonlinear input $u_{nl}(n)$ is calculated by the equation (21) using the state amount σ(n), nonlinear gain η, switching function gain mat S, input matrix mat B, scalar value function β(n), and the sign function sgn[σ(n)].

The processing of the step S15 corresponds to the function of the nonlinear input calculation unit 24 of FIG. 2.

In a following step S16, the linear input $u_{eq}(n)$ is calculated by the equation (13) using the state amount $x_1(n)$, target value $\sigma_1(n)$, switching function gain mat S, input matrix mat B and system-matrix mat A. The processing of the step S16 corresponds to the function of the linear input calculation unit 25 of FIG. 2.

In a following step S17, the linear input $u_{eq}(n)$ is integrated.

In a following step S18, the sum of the integral value and the nonlinear input $u_{nl}(n)$ is calculated as the air-fuel ratio control input $u_{sl}(n)$. The processing of the steps S17, S18 corresponds to the function of the integrator 26 of FIG. 2.

In a following step S19, the air-fuel ratio control input $u_{sl}(n)$ is converted to the air-fuel ratio feedback correction value ALPHA by the following equation (26).

$$ALPHA = \frac{CYLAF}{\{CYLAF + u_{sl}(n)\}} \cdot 100 \qquad (26)$$

where,

CYLAF=air-fuel ratio of the air-fuel mixture which burns in the combustion chamber 1A.

In the equation (25), units are converted from ratios to percentages. The processing of the step S19 corresponds to the function of the conversion unit 28 of FIG. 2.

In a following step S20, the controller 11 limits the air-fuel ratio feedback correction value ALPHA with a predetermined limiting value.

Processing of step S20 corresponds to the function of the correction limitation unit 29 of FIG. 2.

In the last step S201, an injection pulse-wave signal corresponding to the air-fuel ratio feedback correction value ALPHA after limitation is output to the fuel injector 5.

The processing of the step S201 corresponds to the function of the fuel injection amount calculation unit 30 of FIG. 2.

A controller 11 terminates the routine after processing of the step S201.

The equation (26) is reduced from the following equation (27).

$$CYLAF = \frac{14.76 \cdot TP}{TP \cdot TFBYA \cdot (ALPHA + KBLRC - 1)} \qquad (27)$$

Next, the setting process of the element $S_1$ of the switching function gain mat S when the air-fuel ratio of the air-fuel mixture in the combustion chamber 1A is feedback controlled is described.

Herein, what is required is to calculate only one element $S_1$ of the switching function gain mat S. Another element $S_2$ is necessarily equal to 1 or −1 for the reason later mentioned.

If the air-fuel ratio of the air-fuel mixture in combustion chamber 1A changes suddenly as a result of air-fuel ratio feedback control, an undesirable effect may appear in the drivability of the vehicle or in the exhaust gas composition of the engine 1.

So, it is necessary to limit the feedback correction amount of the fuel injection amount with a threshold value so as not to cause the variation in the air-fuel ratio of the air-fuel mixture to become excessively large.

On the other hand, if the air-fuel ratio feedback correction amount is suppressed to a small value, the convergency to the target air-fuel ratio will be slower.

To summarize the above, the convergency of the air-fuel ratio to the target air-fuel ratio and drivability of the vehicle as well as the exhaust gas composition of the engine may have the a trade-off relation.

The integral gain μ which provides a preferable time constant with respect to the air-fuel ratio control response is expressed by the following equation (28). This equation (28) is obtained from the equation (13) which calculates the linear input $u_{eq}(n)$ and the integration term of the right-hand side of the equation (22) which calculates the air-fuel control input $u_{sl}(n)$.

$$\mu = \kappa \cdot (S_1 \cdot b_1 + S_2 \cdot b_0)^{-1} \cdot \left(a_1 \cdot S_1 + a_0 \cdot S_2 + \frac{S_1^2}{S_2}\right) \quad (28)$$

If the integration gain κ of the linear input is set equal to unity in the equation (28), the element $S_1$ of the switching function gain mat S which represents the slope of the straight line in FIG. 5 is expressed by the following equation (29).

$$S_1 = \frac{\left[-S_2 \cdot (a_1 - \mu \cdot b_1) \pm S_2 \cdot \{(a_1 - \mu \cdot b_1)^2 - (a_0 - \mu \cdot b_0)\}^{\frac{1}{2}}\right]}{2} \quad (29)$$

Since $S_1$ calculated by the equation (29) can take two values, the controller 11 performs stability distinction and selects the value that provides higher stability.

Next, referring to FIG. 8, a subroutine for calculating the element $S_1$ of the switching function gain mat S will be described.

Figure 7:
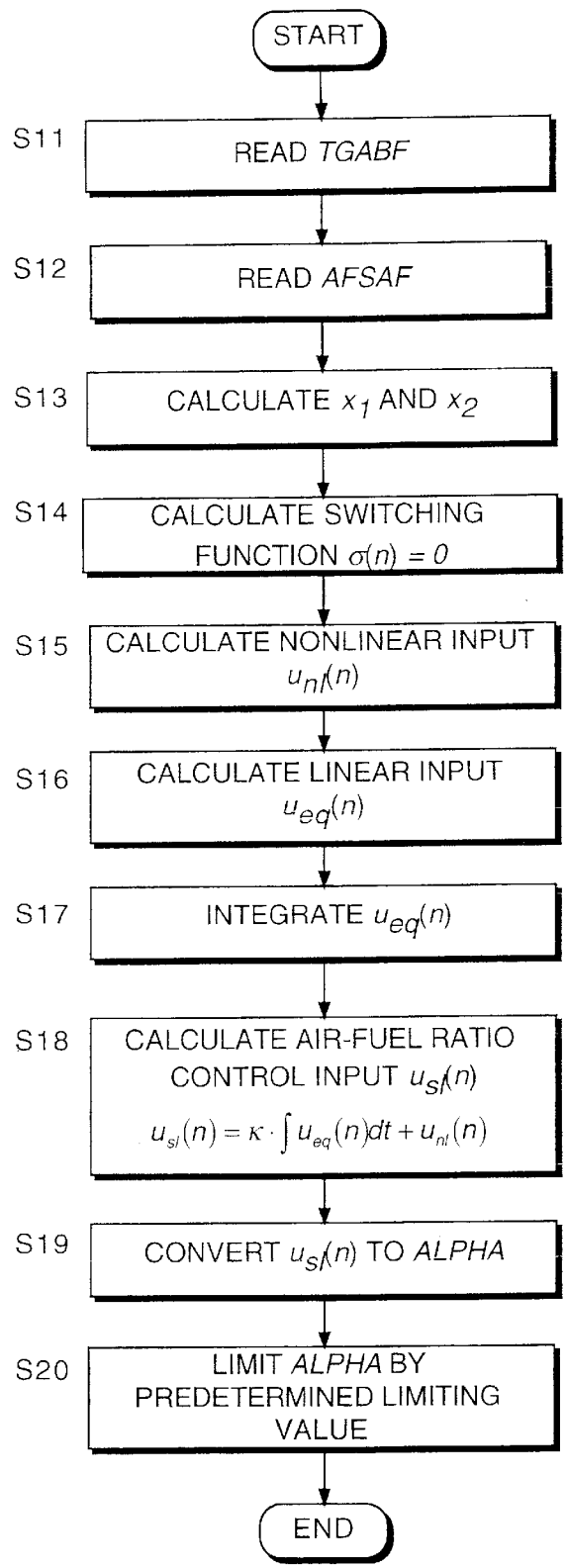
FIG. 7 is a flowchart describing a routine for calculating an air-fuel ratio feedback correction value ALPHA performed by the controller.

This subroutine is performed as a part of the processing of the step S14 of the routine of FIG. 7, which calculates the air-fuel ratio feedback correction value ALPHA.

First in a step S21, the controller 11 determines the integral gain μ that provides the aforesaid preferable time constant with respect to the air-fuel ratio control response.

Figure 12:
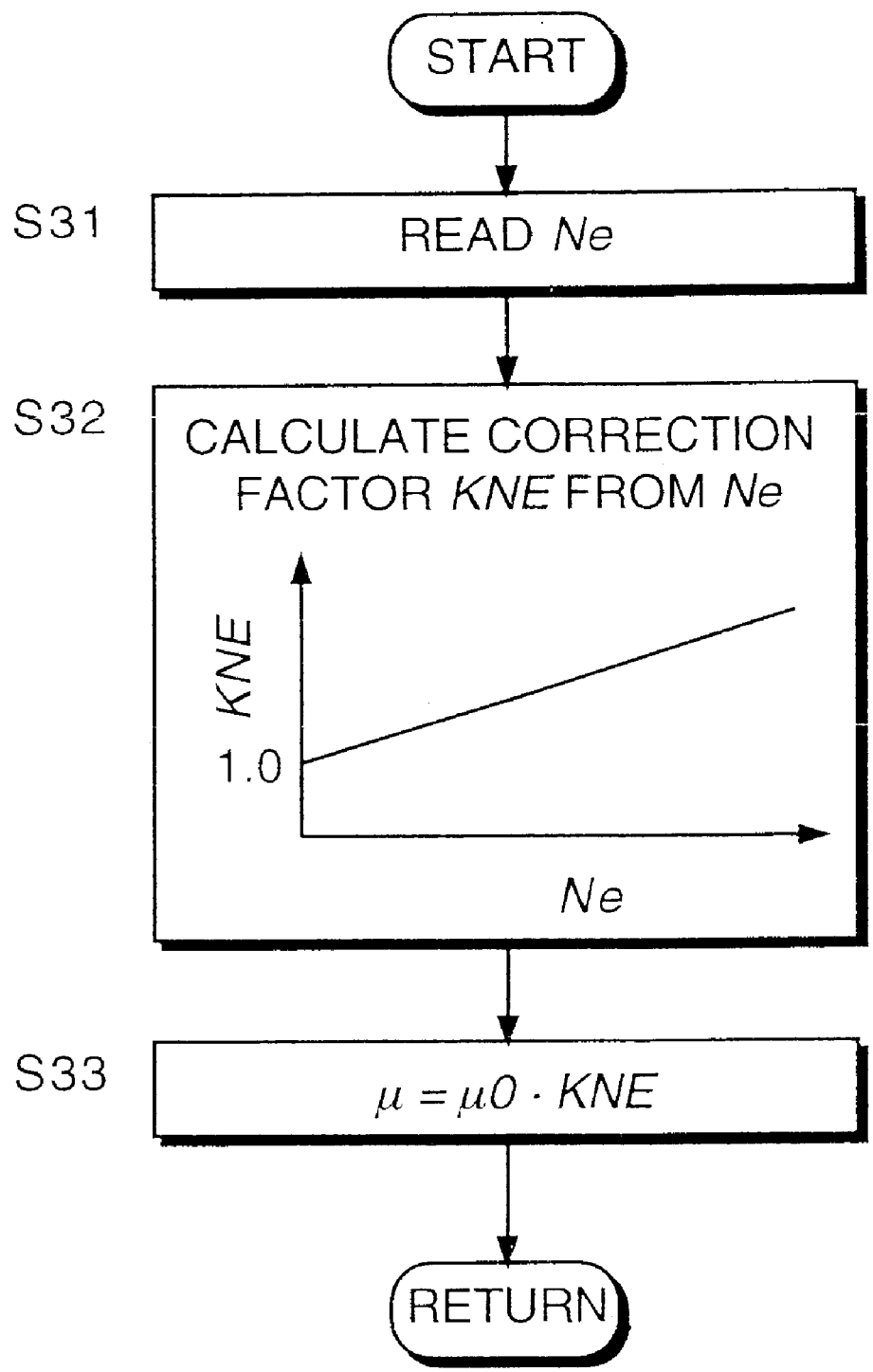
FIG. 12 is a flowchart describing a subroutine for calculating an integration gain $\mu$ performed by the controller.

Here, the integral gain μ is determined by performing a subroutine shown in FIG. 12, but it is also possible to those skilled in the art to set the integral gain μ to a fixed value that is empirically proved to be practical.

In a following step S22, based on the integral gain μ, the element $S_1$ of the switching function gain mat S is calculated by the equation (29).

Although the value of $S_2$ is required in order to calculate the element $S_1$, due to the reason described below, the value of $S_2$ is equal to unity when the element $a_0$ of the system-matrix mat A is a positive value and the value of $S_2$ is equal to negative unity when the element $a_0$ of the system-matrix mat A is a negative value.

Referring to FIGS. 9A, 9B and FIGS. 10A, and 10B, a variation of the air-fuel ratio feedback correction value ALPHA when the integration gain μ is set to a fixed value will be described.

Figures 9A, 9B:
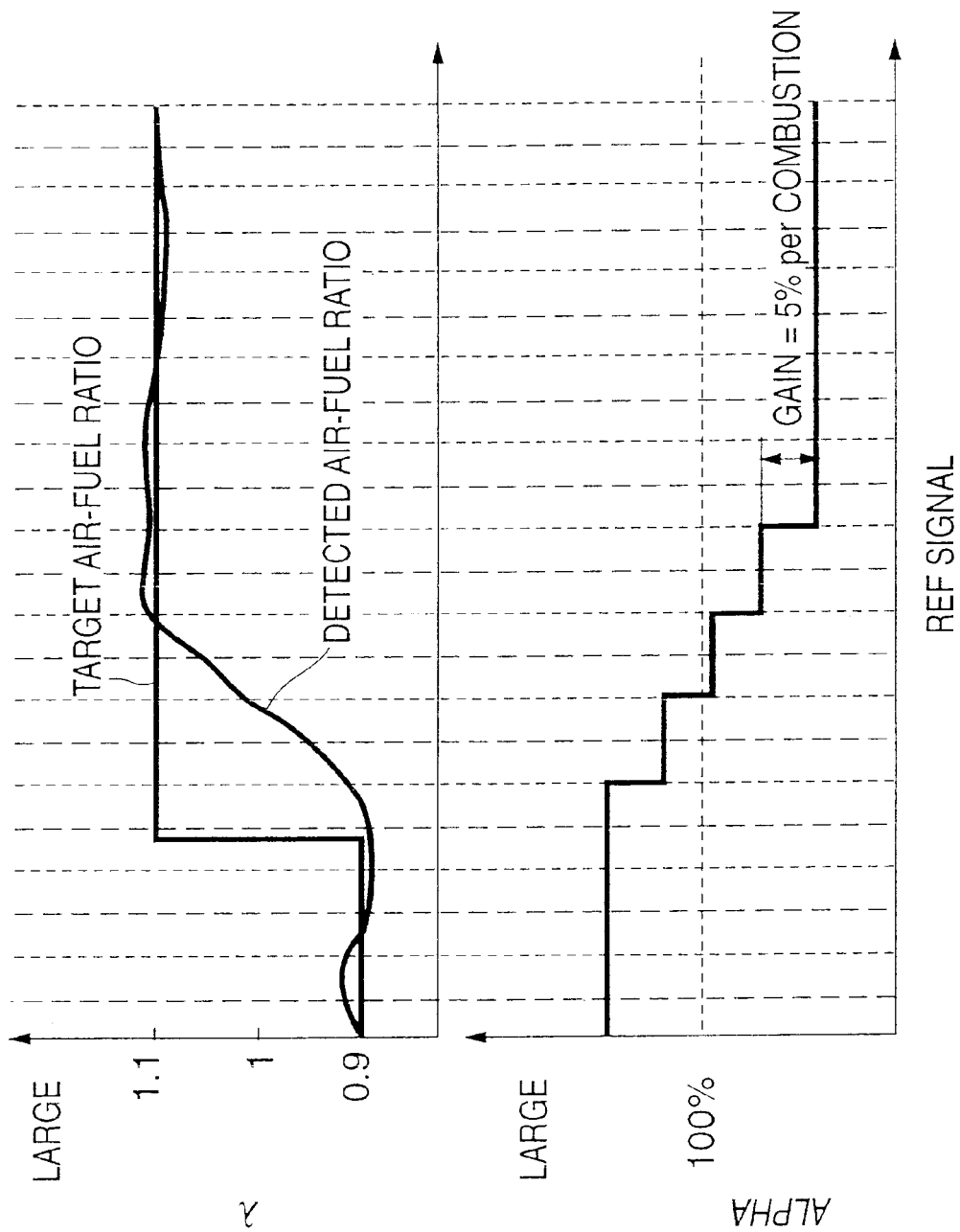
FIGS. 9A and 9B are timing charts showing a variation of the air-fuel ratio feedback correction value ALPHA when the air-fuel ratio in the cylinder is controlled using a fixed integration gain in a low rotation-speed region.
Figures 10A, 10B:
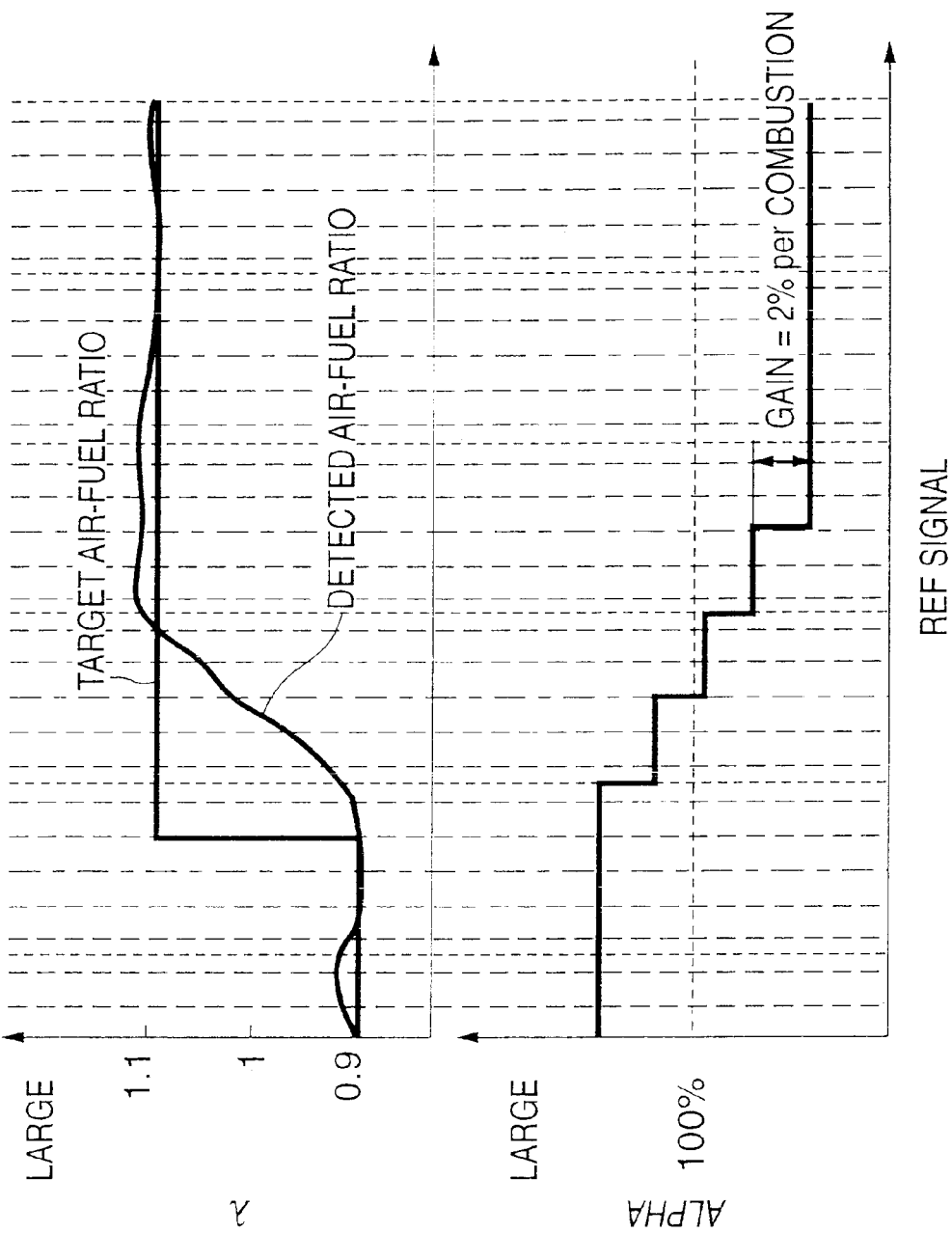
FIGS. 10A and 10B are timing charts showing a variation of the air-fuel ratio feedback correction value ALPHA when the air-fuel ratio in the cylinder is controlled using a fixed integration gain in a high rotation-speed region.

FIGS. 9A and 9B show a variation of the air-fuel ratio feedback correction value ALPHA at a low engine rotation speed, and FIGS. 10A and 10B show a variation of the air-fuel ratio feedback correction value ALPHA at a high engine rotation speed.

Since the fuel injection amount per unit time increases with a raise of the rotation speed of an engine 1 in calculating the air-fuel ratio feedback correction value ALPHA at intervals of fixed time spacing, i.e., ten milliseconds, the variation of the air-fuel ratio feedback correction value ALPHA per one injection at high rotation speed is smaller than that at low rotation speed. With respect to the examples shown in the figures, ALPHA varies for two percent at low rotation speed while it varies for five percent at high rotation speed under an identical integration gain.

Therefore, when the integration gain matched with low rotation is applied to high rotation, the variation of the air-fuel ratio feedback correction value ALPHA per one injection becomes too small, and the air-fuel ratio control response will be poor.

Due to the above reason, in order to maintain the air-fuel ratio control response in a desirable range, it is preferable to vary the value of the integration gain according to the rotation speed of an engine 1.

FIGS. 11A and 11B show a variation of the air-fuel ratio feedback correction value ALPHA when the integration gain is set according to the rotation speed of an engine 1.

By selecting a different integration gain according to the rotation speed of an engine 1, the variation of the air-fuel ratio feedback correction value ALPHA per one injection can be increased to five percent that is equal to the value obtained in the case of FIGS. 9A and 9B.

The axis of abscissa of these diagrams is a crank angle, and a perpendicular broken line shows spacing of the Ref signal which a crank angle sensor 12 outputs at a predetermined rotation position of the engine 1.

Ref signal is output at intervals of 180 degrees with a four-stroke cycle four cylinder engine.

Figure 8:
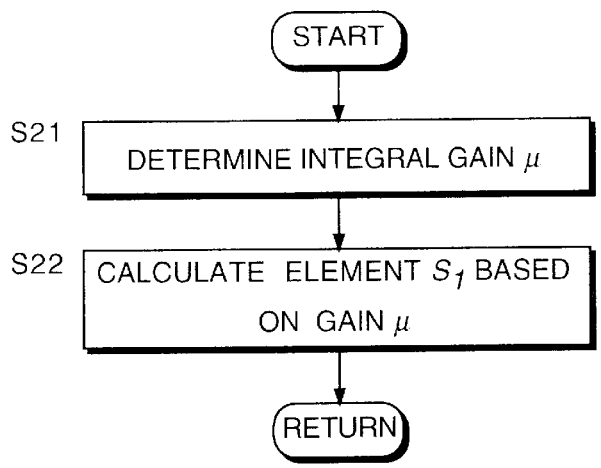
FIG. 8 is a flowchart describing a subroutine for calculating a switching function gain element $S_1$ performed by the controller.

The subroutine of FIG. 8 for calculating the element $S_1$ of the switching function gain mat S is provided to satisfy the above requirement.

Next, referring to FIG. 12, the subroutine for setting the integration gain μ will be described. This subroutine is performed in the step S21 of the subroutine of FIG. 8.

First, in a step S31, the rotation speed Ne of the engine 1 is read. The rotation speed Ne is obtained from the signal input to the controller 11 from the crank angle sensor 12.

In a following step S32, with reference to the map of a characteristic as shown in the figure, a correction factor KNE is obtained according to the rotation speed Ne.

In a following step S33, the integration gain μ is calculated by multiplying an integration gain basic value μ0 by the correction factor KNE. Herein, the integration gain basic value is a fixed value matched with the minimum rotation speed of an engine 1.

In the step S21 of FIG. 8, therefore, the element $S_1$ of the switching function gain mat S is calculated using the integration gain that is set according to the rotation speed of the engine 1.

The controller 11 applies the switching function gain element $S_1$ thus calculated, for the calculation of the non-linear input in the step S15 and for the calculation of the liner input in the step S16 of the routine of FIG. 7.

Next, the calculation of the nonlinear input and the linear input using the switching function gain element $S_1$ will be described in detail below.

First, the equation (8) defining the state quantity σ(n) of the switching function is converted into the following equation (30) using the equation (7).

$$\sigma(n) = \text{mat } S \cdot \text{mat } e(n) \quad (30)$$
$$= S_1 \cdot \{x_1(n) - \theta_1\} + S_2 \cdot \{x_2(n) - \theta_2\}$$
$$= S_1 \cdot \{x_1(n) - \theta_1\} - S_2 \cdot a_0 \cdot \{x_1(n-1) - \theta_1\}$$

The sign of the state quantity mate of the error must have alternated when the state quantity mat e(n) of the error crosses the line of the switching function shown in FIG. 5.

Therefore, the sign of the first term and the sign of the second term of the right hand side of the equation (30) must be different.

The following conditions are drawn from the above logic.

(i) In the case of $a_0 > 0$, $S_2 = 1$, and
(ii) in the case of $a_0 < 0$, $S_2 = -1$.

The state quantity σ(n) of the switching function in each of the above conditions can be expressed by the following equations (31) and (32) using the elements.

(i) In the case of $a_0 > 0$:

$$\sigma(n) = S_1 \cdot \{x_1(n) - \theta_1\} + \{x_2(n) - \theta_2\} \quad (31)$$

(ii) In the case of $a_0<0$:

$$\sigma(n)=S_1\cdot\{x_1(n)-\theta_1\}-\{x_2(n)-\theta_2\} \quad (32)$$

Moreover, if the above conditions (i) and (ii) are applied to the equation (13) of the linear input, the equation (21) of the nonlinear input, the total control input, and the equation (22) of the total control input or the air-fuel ratio control input, the following equations (33)–(38) will be obtained.

The actual calculation of the steps S15–S17 of the routine of FIG. 7 is performed using these equation (33)–(38).

Linear Input (i) In the case of $a_0>0$:

$$u_{eq}(n)=(S_1\cdot b_1+b_0)^{-1}\cdot(a_1\cdot S_1+a_0+1)\cdot\{x_1(n)-\theta_1(n)\} \quad (33)$$

(ii) In the case of $a_0<0$:

$$u_{eq}(n)=(S_1\cdot b_1-b_0)^{-1}\cdot(a_1\cdot S_1-a_0-1)\cdot\{x_1(n)-\theta_1(n)\} \quad (34)$$

Nonlinear Input (i) In the case of $a_0>0$:

$$u_{nl}(n)=\{\eta|S_1\cdot b_1+b_0|^{-1}|\sigma(n)|+\beta(n)\}\cdot sgn[\sigma(n)] \quad (35)$$

where, $0<\eta<1$ and $\sigma(n+1)\,\sigma(n)>0$.

(ii) In the case of $a_0<0$:

$$u_{nl}(n)=\{\eta|S_1\cdot b_1-b_0|^{-1}|\sigma(n)|+\beta(n)\}\cdot sgn[\sigma(n)] \quad (36)$$

where, $0<\eta<1$ and $\sigma(n+1)\,\sigma(n)>0$.

Total Control Input (i) In the case of $a_0>0$:

$$u_{sl}(n)=\kappa\cdot\int[(S_1\cdot b_1+b_0)^{-1}(a_1\cdot S_1+a_0+1)\cdot\{x_1(n)-\theta_1(n)\}]\cdot dt+ \quad (37)$$
$$\{\eta|S_1\cdot b_1+b_0|^{-1}|\sigma(n)|+\beta(n)\}\cdot sgn[\sigma(n)]$$

(ii) In the case of $a_0<0$:

$$u_{sl}(n)=\kappa\cdot\int[(S_1\cdot b_1-b_0)^{-1}(a_1\cdot S_1-a_0-1)\cdot\{x_1(n)-\theta_1(n)\}]\cdot dt+ \quad (38)$$
$$\{\eta|S_1\cdot b_1+b_0|^{-1}|\sigma(n)|+\beta(n)\}\cdot sgn[\sigma(n)]$$

Figure 13:
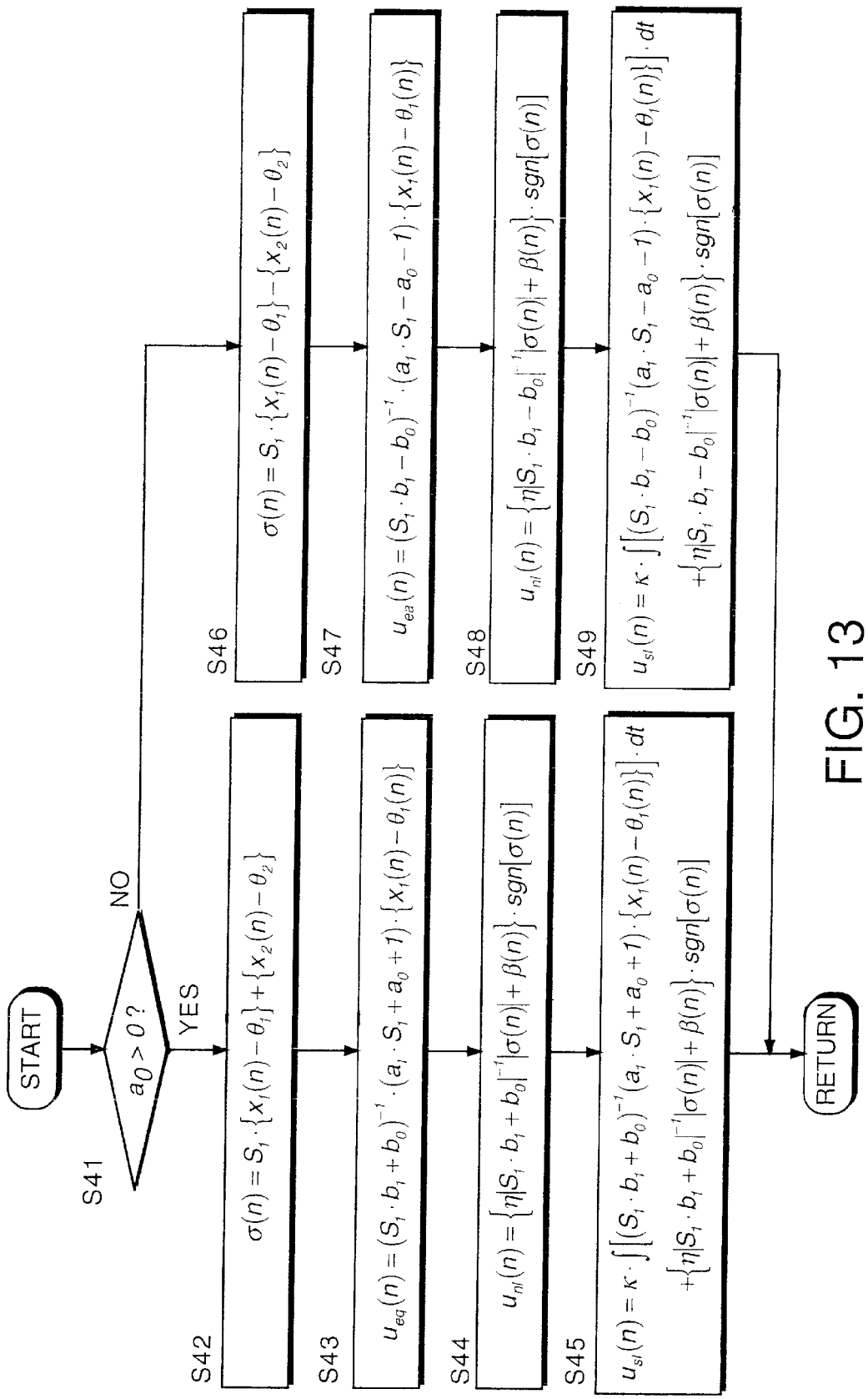
FIG. 13 is a flowchart describing a subroutine for calculating a state quantity $\sigma(n)$ of the switching function, a linear input $u_{eq}(n)$, a nonlinear input $u_{nl}(n)$ and a total control input $U_{sl}$ performed by the controller.

Next, referring to FIG. 13, a subroutine performed by the controller 11 for calculating the state quantity $\sigma(n)$ of the error, the linear input $u_{eq}(n)$, the nonlinear input $u_{nl}(n)$, and the total control input $u_{sl}$ will be described.

This subroutine corresponds to the calculation processing of the step S14 through the step S18 of the routine of FIG. 7, but will be described more in detail according to the positive/negative sign of the element $a_0$ of the system matrix mat A.

The controller 11 determines first whether the sign of the element $a_0$ is positive in a step S41.

When the sign of the element $a_0$ is positive, the processing of steps S42–S45 is performed. When the sign of the element $a_0$ is not positive, the processing of steps S46–S49 is performed.

In the step S42, the state quantity $\sigma(n)$ of the switching function is calculated by the equation (31).

In the following step S43, the linear input $u_{eq}(n)$ is calculated by the equation (33).

In the following step S44, the nonlinear input $u_{nl}(n)$ is calculated by the equation (35).

In the following step S45, the total control input $u_{sl}(n)$ is calculated by the equation (37). After the processing of the step S45, the controller 11 terminates the subroutine.

On the other hand, in the step S46, the state quantity $\sigma(n)$ of the switching function is calculated by the equation (32).

In the following step S47, the linear input $u_{eq}(n)$ is calculated by the equation (34).

In the following step S48, the nonlinear input $u_{nl}(n)$ is calculated by the equation (36).

In the following step S49, the total control input $u_{sl}(n)$ is calculated by the equation (38). After the processing of the step S49, the controller 11 terminates the subroutine.

The sliding mode control process of the air-fuel ratio performed by the controller 11 is described above.

In the description so far, the engine 1 is assumed to be a simple system without dead time. However, in reality, the dead time cannot be ignored in order to perform a precise air-fuel ratio control of the engine.

Figure 14:
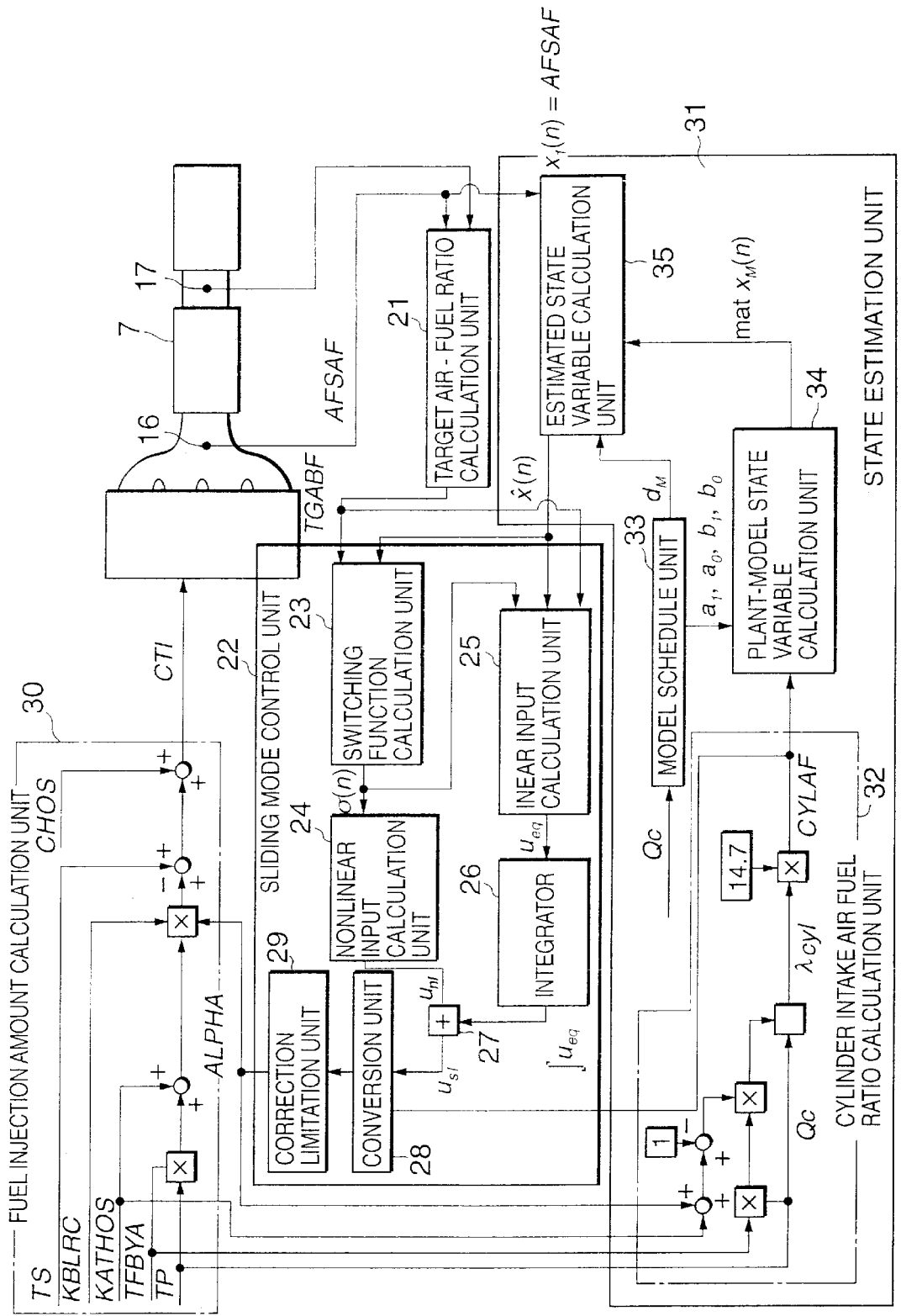
FIG. 14 is a block diagram describing a dead-time compensation function of the controller.

The controller 11 is provided with a state estimation unit 31 for processing of the dead time as shown in FIG. 14.

It should be noted that FIG. 2 is a block diagram provided only for the explanation of the sliding mode control function of the controller 11 according to this invention, and FIG. 14 is a block diagram showing the architecture of the whole control function of the controller 11.

The state estimation unit 31 is equipped with a cylinder intake air-fuel ratio calculation unit 32, a model schedule unit 33, a plant-model state-variable calculation unit 34, and an estimated state variable calculation unit 35.

Figure 17:
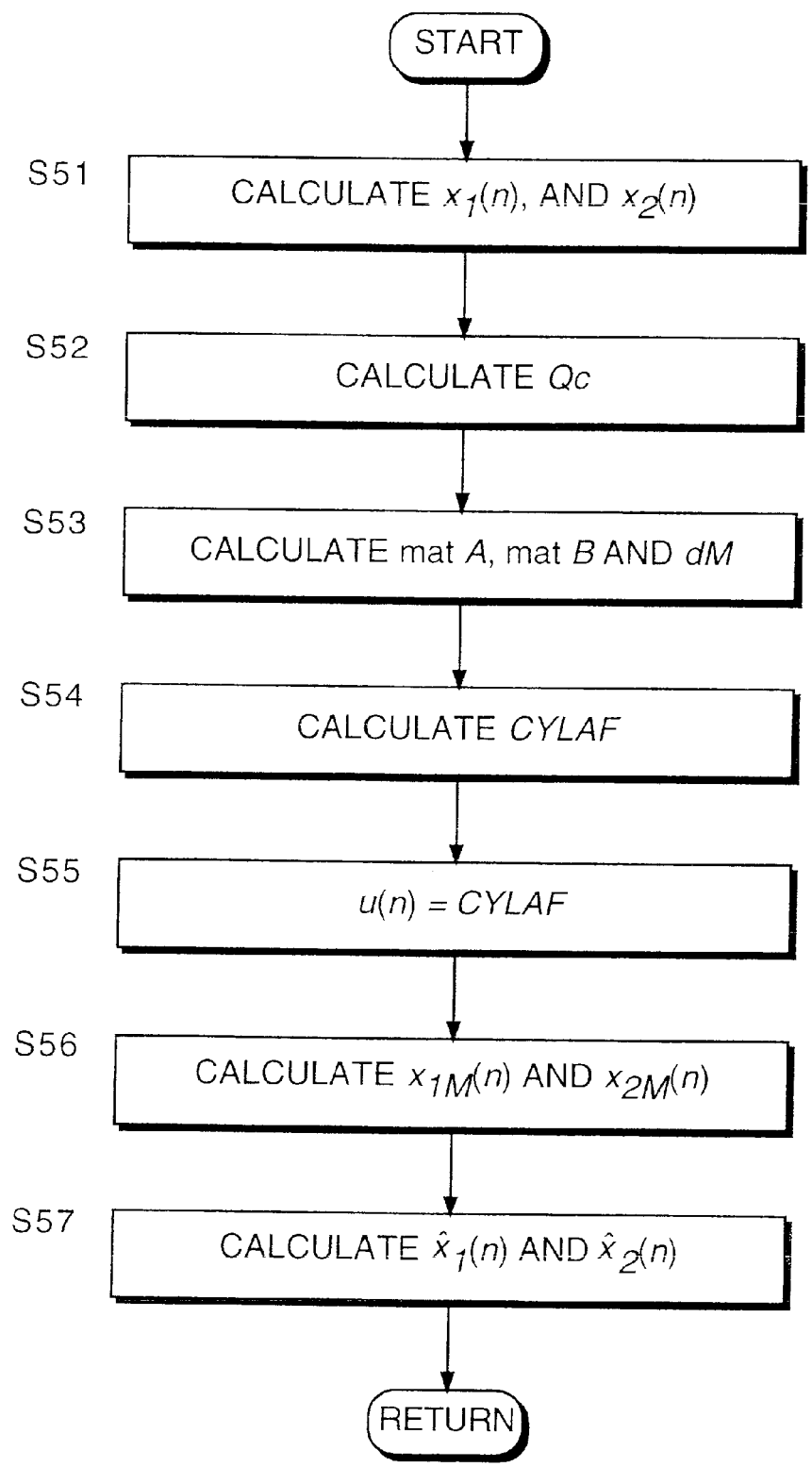
FIG. 17 is a flowchart describing a routine for calculating an estimated state variable performed by the controller.

Respective functions of these units will be described later with reference to the flowchart of FIG. 17.

The processing of the dead time performed by the controller 11 will first be described.

The basic idea for controlling a plant which has dead time is explained in detail below.

Herein, the engine 1 having a dead time in the air-fuel ratio regulation is the control object of the controller 11, so in the following description, it will be referred to as a controlled plant.

The controlled plant can be expressed by the following equations (39) and (40).

$$\text{mat } x(n+1)=\text{mat } A\cdot\text{mat } x(n)+\text{mat } B\cdot u(n-d) \quad (39)$$

$$\text{mat } y(n)=\text{mat } C\cdot\text{mat } x(n) \quad (40)$$

where, mat $x(n)$=state quantity of the controlled plant, mat $y(n)$=output of the controlled plant, $u(n-d)$=input of the controlled plant, mat A=system matrix of the controlled plant, mat B=input matrix of the controlled plant, mat C=output matrix of the controlled plant, and d=dead time of the controlled plant.

Comparing the equation (39) with the equation (3), the only difference is that $u(n)$ of the equation (3) is replaced by $u(n-d)$ in the equation (39).

The equation (40) is identical to the equation (4).

The equations (3) and (4) are state equations for a plant without dead time. In contrast with the controlled plant, a plant without dead time is hereinafter referred to as a plant model.

In order to distinguish the state equations for the controlled plant from those of the plant model, in the following description, subscript M will be attached to the state variables of the plant model.

According to this notation, the state equations (3) and (4) representing the plant model are rewritten into the following equations (41) and (42).

$$\text{mat } x_M(n+1) = \text{mat } A \cdot \text{mat } x_M(n) + \text{mat } B \cdot u(n) \quad (41)$$

$$\text{mat } y_M(n) = \text{mat } C \cdot \text{mat } x_M(n) \quad (42)$$

where, mat $x_M(n)$=state variable of the plant model,
mat $y_M(n)$=output of the plant model,
u(n)=input of the plant model,
mat A=system matrix of the plant model,
mat B=input matrix of the plant model,
mat C=output matrix of the plant model, and
mat x(n)=state variable.

Although the transfer function Geng(q) of the plant model is expressed with the equation (2), the transfer function Geng(z) of the controlled plant is expressed with the following equation (43).

$$Geng(z) = \frac{b_1 \cdot z^{-1} + b_0 \cdot z^{-2}}{\{1 + (z^{-1} - d) \cdot a_1 + (z^{-1} - d)^2 \cdot a_0\}} \quad (43)$$

where, $a_1$, $a_0$=differentiation multiplier,
$b_1$, $b_0$=differentiation multiplier, and
d=dead time.

Figure 15:
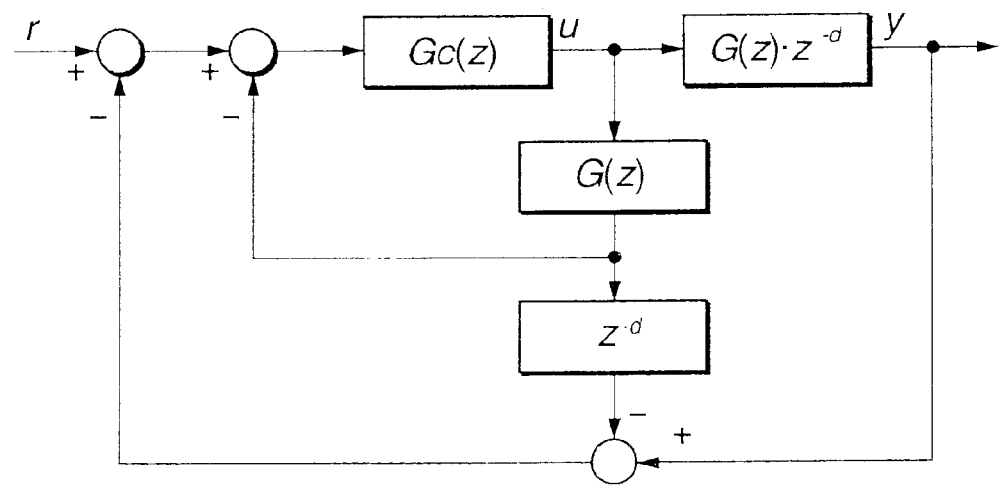
FIG. 15 is a block diagram describing a principle of the Smith method applied for a dead-time compensation.

U.S. Pat. No. 5,544,039 disclose the correction approach using the Smith method shown in FIG. 15, in order to compensate the effect of the dead time which the controlled plant suffers.

The Smith method is a compensation method for the dead time developed by O. J. M. Smith, Department of Electrical Engineering and Computer Sciences, University of California, Berkeley.

According to the Smith method, the state variable mat $\hat{x}(n+d_M)$ of the controlled plant after the model dead time $d_M$ has elapsed is expressed with the following equation (44).

The state variable of the controlled plant after the model dead time $d_M$ has elapsed is referred to as an estimated state variable in the following description.

$$\text{mat } \hat{x}(n + d_M) = \quad (44)$$

$$\text{mat } A^d \cdot \text{mat } x(n) + [B, AB, \cdots, A^{d-1}B] \cdot \begin{bmatrix} u(n-1) \\ \vdots \\ u(n-d_M) \end{bmatrix}$$

where, mat $\hat{x}(n+d_M)$=estimated state variable.

The above equation (44) is transformed using the equations (41) and (42) to the following equation (45).

$$\text{mat } \hat{x}(n) = \text{mat } x(n + d_M) \quad (45)$$

$$= \text{mat } A^d \cdot \text{mat } x(n) + \text{mat } x_M(n) - \text{mat } A^d \cdot$$

$$\text{mat } x_M(n - d_M)$$

mat $x_M(n-d_M)$ of the right-hand side of the equation (45) is the state variable of the plant model after the model dead time $d_M$ has elapsed. Although the Smith method can apply a desirable response to target value input, it is known that the transient response over a disturbance is not necessarily good.

Figure 16:
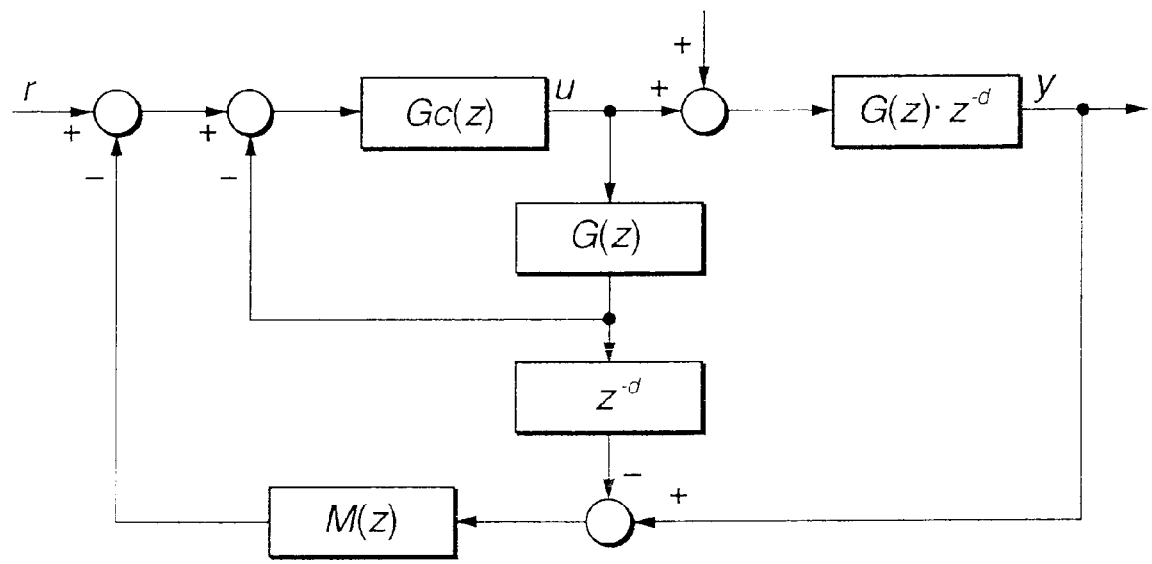
FIG. 16 is a block diagram describing a disturbance correction combined with the dead-time compensation based on the Smith method, applied by the controller.

In order to improve this drawback, adding a disturbance compensator, as shown in FIG. 16 is known.

A method of designing the disturbance compensator is disclosed for example by "Control of Dead Time System" issued by Corona publishing company under the supervision of the Society of Measurement and Automatic Control.

In the air-fuel control device according to this invention, research on the actual dynamic characteristics of a model shown in FIG. 16, and the transfer function M(z) was designed based on the research result.

To summarize the research result, due to the observability of the state variable mat x(n), the estimated state variable mat $\hat{x}(n)$ can be expressed by the equations (46), (47) or the equation (48) below.

$$\text{mat } \hat{x}(n) = \text{mat } x(n + d_M) \quad (46)$$

$$= \text{mat } M(n) \cdot \{\text{mat } x(n) - \text{mat } x_M(n - d_M)\} +$$

$$\text{mat } x_M(n)$$

or $$\text{mat } \hat{x}(n) = \text{mat } x(n + d_M) \quad (48)$$

$$= \text{mat } x(n) - \text{mat } x_M(n - d_M) + \text{mat } x_M(n)$$

where, mat $\hat{x}(n)$=state variable of the controlled plant after the model dead time $d_M$ has elapsed,
mat x(n)=state variable of the controlled plant,
mat $x_M(n)$=state variable of the plant model,
mat $x_M(n-d_M)$=state variable of the plant model after the model dead time $d_M$ has elapsed, and
mat M(n)=system matrix of the disturbance compensator.

When the equation (48) is expressed with scalar values, the state quantities $\hat{x}_1(n)$ and $\hat{x}_2(n)$ of the estimated state variable mat $\hat{x}(n)$ are expressed by the following equations (49) and (50). In the following description $\hat{x}_1(n)$ and $\hat{x}_2(n)$) are referred to as an estimated state quantity.

$$\hat{x}_1(n) = x_1(n+d_M) = x_1(n) - x_{1M}(n-d_M) + x_{1M}(n) \quad (49)$$

$$\hat{x}_2(n) = x_2(n+d_M) = x_2(n) - x_{2M}(n-d_M) + x_{2M}(n) \quad (50)$$

The meaning that the equation (48) implies will now be described with respect to a case where there is no disturbance, and a case where there is a disturbance.

(i) When there is no disturbance:

Providing that there is no disturbance and that the plant model precisely represents the controlled plant, the second term of the right hand side of the equation (48), i.e., the state variable mat $x_M(n-d_M)$ of the plant model after model dead-time $d_M$ has elapsed should be equal to the state variable mat x(n) that can actually be observed. In this case, the equation (48) can therefore be rewritten into the following equation (51).

$$\text{mat } x_M(n-d_M) = \text{mat } x(n) \quad (51)$$

In other words, the right-hang side of the equation (48) consists only of the third term mat $x_M(n)$.

The state variable mat $x_M(n)$ of the plant model is an estimated value of the state variable mat x(n) that will be detected in the controlled plant after the actual dead time d has elapsed, so it can be regarded as the estimated state quantity $\hat{x}_1(n)$.

In this case, the controller 11 performs a feedback control of the air-fuel ration of the air-fuel mixture in the engine 1 using the estimated state quantity $\hat{x}_1(n)$ as a parameter.

(ii) When there is a disturbance:

Providing that a load g due to the disturbance is exerted or the plant model cannot represent the controlled plant correctly, the state variable mat $x_M(n-d_M)$ of the plant model after the model dead time $d_M$ has elapsed will bring a different result from the state variable mat $x(n)$ of the controlled plant that is actually observed later.

In this state, the second term of the right-hand side of the equation (48) cannot be eliminated.

If the disturbance g is step input here, or a variation of the state variable mat $x(n)$ of the controlled plant is a step response, the state variable mat $x_M(n)$ will take the same value as the state variable $x_M(n-d_M)$, when the model dead time $d_M$ has really elapsed.

If the system matrix mat M(n) of the disturbance compensator is equal to unity, the right-hand side of the equation (46) will consist only of the state variable mat $x(n)$ of the controlled plant that is actually observed.

In this case, the controller 11 will perform feedback control of the air-fuel ratio by using the state variable mat $x(n)$ of the controlled plant as a parameter. Although it is not a feedback control based on the estimated state, the effect of the disturbance can be eliminated.

Thus, in FIG. 16, by setting the transfer function M(z) of the disturbance compensator equal to unity, the combination of the dead time compensation according to Smith method and the disturbance compensation can be realized.

Next, referring to FIG. 17, a routine for calculating the estimated state variable mat $\hat{x}(n)$ will be described.

This routine corresponds to the function of the state estimation unit 31 in FIG. 14, and is performed at intervals of ten milliseconds, when the engine 1 is operated with the target air-fuel ratio equivalent to the stoichiometric air-fuel ratio.

First, in a step S51, the controller 11 calculates the state quantities $x_1(n)$ and $x_2(n)$.

Here, $x_1(n)$ is equal to the air-fuel ratio AFSAF detected by the upstream air-fuel ratio sensor 16. $x_2(n)$ is calculated by the equation (66) which will be described later. The state variable mat $x(n)$ is determined from these state quantities $x_1(n)$ and $x_2(n)$.

In a step 52, the cylinder intake air amount Qc is calculated by the following equation (52). The equation (52) calculates the cylinder intake air amount Qc by performing a reverse calculation from the basic fuel injection pulse width TP.

$$Qc = \frac{TP}{KCONSTA\#} \tag{52}$$

where,

Qc=cylinder intake air amount (kilogram/cycle),
TP=basic fuel injection pulse width (millisecond/cycle), and
KCONST#=constant (millisecond/kilogram).

Figure 18:
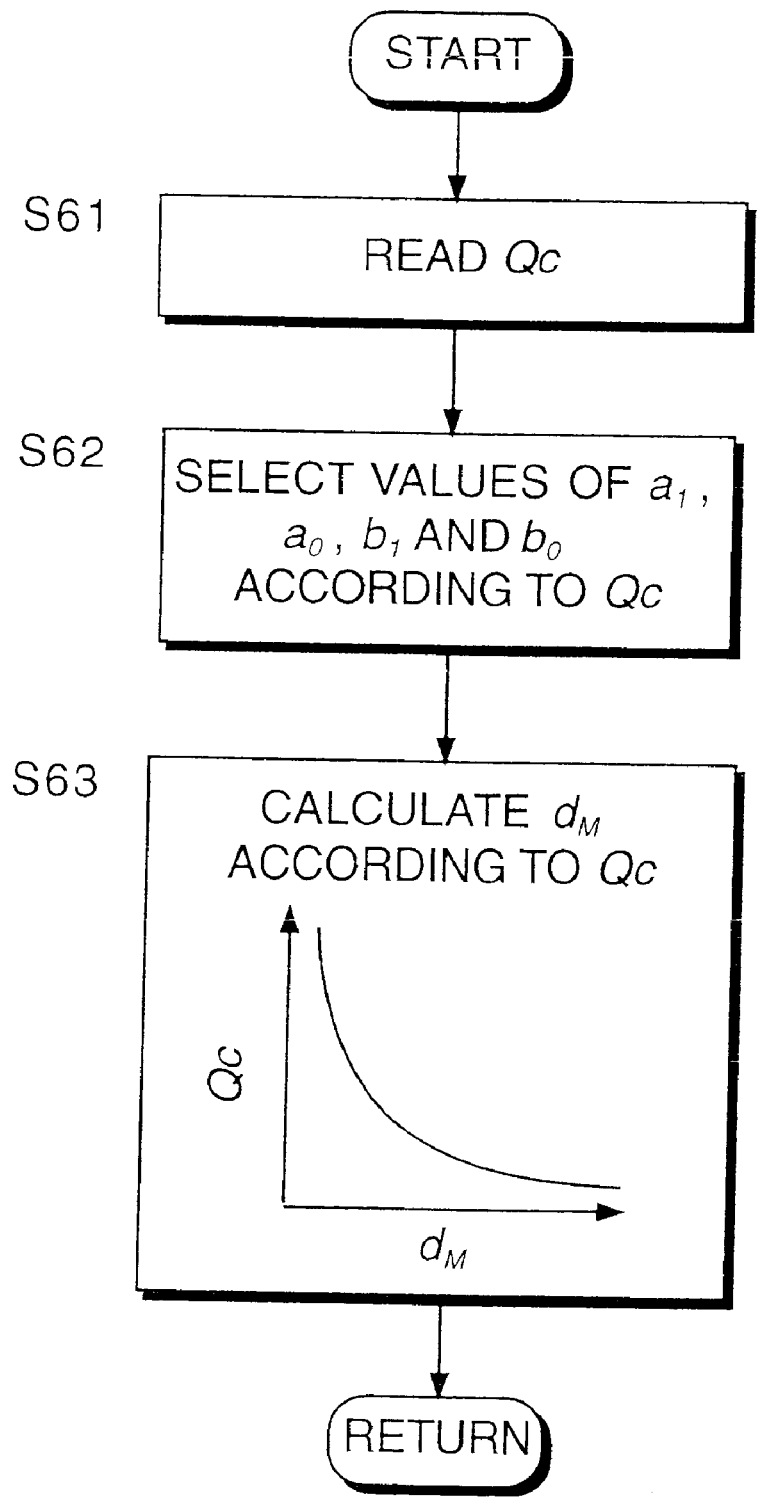
FIG. 18 is a flowchart describing a subroutine for calculating a model dead time $d_M$ performed by the controller.

In a following step S53, the system matrix mat A, the input matrix mat B, and the model dead time $d_M$ of the plant model are calculated based on the cylinder intake air amount Qc by performing a subroutine shown in FIG. 18.

Referring to FIG. 18, in a first step S61, the controller 11 reads the cylinder intake air amount Qc.

In a step S62, according to the cylinder intake air amount Qc, the elements $a_1$ and $a_0$ of system matrix mat A and the elements $b_1$ and $b_0$ of the input matrix mat B are determined.

The dynamic characteristic of the air-fuel ratio of an engine has a strong nonlinear nature depending on the operation range of the engine.

Accordingly, a single dynamic characteristic model cannot represent the dynamic characteristic of the engine for all the operation ranges. The system matrix mat A and the input matrix mat B vary according to the operation range, and the state equation of the plant model of the secondary discrete system will also be different according to the operation range.

In order to cope properly with such a condition, the operation range of the engine 1 is divided into eight ranges according to the cylinder intake air amount Qc, and the values of the elements $a_1$, $a_0$, $b_1$, and $b_0$ matching with the respective operation ranges are previously determined and prestored in the memory of the controller 11.

When the engine 1 operates, the controller 11, in the step S62, first determines the operation range according to the cylinder intake amount Qc calculated in the step S61, and then selects a set of the elements $a_1$, $a_0$, $b_1$, and $b_0$ which corresponds to the determined operation range #1–#8.

For example, when the cylinder intake air amount Qc is a value between Qc1 and Qc2, the controller 11 determines that the operation range corresponds to a range #2, and sets the values of the elements $a_1$, $a_0$, $b_1$, and $b_0$ equal to those prestored for the range #2.

In a step S63, the controller 11 calculates the model dead time $d_M$ by searching a map as shown in the figure based on the cylinder intake air amount Qc.

The model dead time $d_M$ has such a characteristic that it takes a larger value as the cylinder intake amount Qc becomes smaller.

The dead time from when the fuel injection amount varies until when the resultant change in the air-fuel ratio is detected by the upstream air-fuel ratio sensor 16 depends on the flow velocity of cylinder intake air, and is large when the flow velocity is small.

Accordingly, a single model dead time cannot cover the whole flow velocity range of the cylinder intake air.

In order to set the optimal model dead time, therefore, different values are assigned for the model dead time $d_M$ according to the cylinder intake air amount Qc.

After performing the processing of the step S63, the controller terminates the subroutine.

Referring again to FIG. 17, after calculating the system-matrix mat A, the input matrix mat B, and the model dead time $d_M$ of the plant model in the step S53, the controller 11 calculates the air-fuel ratio CYLAF of the air-fuel mixture in the combustion chamber 1A in a step S54.

In this calculation, the controller 11 first calculates a fuel injection pulse width TIPSCYL by the following equation (53).

$$TIPSCYL = TP \cdot TFBYA \cdot (ALPHA + KBLRC - 1) \tag{53}$$

where,

TP=basic fuel injection pulse width,
TFBYA=target equivalence ratio,
ALPHA=air-fuel ratio feedback correction value, and
KBLRC=air-fuel ratio learning value.

The air-fuel ratio feedback correction value ALPHA used by the equation (53) is a value obtained by the immediately preceding execution of the routine of FIG. 7.

As for the air-fuel ratio learning value KBLRC, also the newest value available at the time of the execution of this subroutine is applied.

The air-fuel ratio learning value KBLRC is a value calculated based on the air-fuel ratio feedback correction value ALPHA. The calculation method of the air-fuel ratio learning value KBLRC is disclosed by U.S. Pat. No. 6,014,962.

Using the air-fuel ratio feedback correction value ALPHA and the air-fuel ratio learning value KBLRC for the calculation of the fuel injection pulse width TIPSCYL is based on the following reason.

There is an individual difference in the upstream air-fuel ratio sensor 16 or the fuel injector 5 which are a part of the controlled plant.

If the fuel injection pulse width TIPSCYL is calculated from a value which has not been corrected by the air-fuel ratio feedback correction value ALPHA and the air-fuel ratio learning value KBLRC, an error due to the individual difference of the upstream air-fuel ratio sensor 16 or the fuel injector 5 will be incorporated into the state equation of the plant model.

Applying the air-fuel ratio feedback correction value ALPHA and the air-fuel ratio learning value KBLRC for the calculation of the fuel injection pulse width TIPSCYL prevents such an error from being incorporated into the state equation of the plant model, even when there is an individual difference in the upstream air-fuel ratio sensor 16 or in the fuel injector 5.

The controller 11 calculates a fuel injection amount Fc by the following equation (54).

$$Fc = \frac{TIPSCYL}{KCONST\#} \tag{54}$$

where,

Fc=fuel injection amount (kilogram/cycle),

TIPSCYL=fuel injection pulse width (millisecond/kilogram), and

KCONST#=constant (millisecond/kilogram).

An excess air factor λcyl is expressed by the following equation (55).

$$\lambda cyl = \frac{Qc}{Fc \cdot 14.7} \tag{55}$$

Accordingly, the air-fuel ratio CYLAF of the air-fuel mixture in the combustion chamber 1A is expressed by the following equation (56).

$$CYLAF = \frac{Qc}{Fc} = \lambda cyl \cdot 14.7 \tag{56}$$

The cylinder intake air amount Qc is the value calculated by the equation (52), and the fuel injection amount Fc is the value calculated by the equation (54).

The above-mentioned equation (27) is obtained by substituting the equation (52) and the equation (54) for the equation (55).

Referring back to FIG. 17, in a step S55, the controller 11 sets the input u(n) equal to the air-fuel ratio CYLAF of the air-fuel mixture in the combustion chamber 1A.

In a following step S56, the controller 11 calculates the state quantities $x_{1M}(n)$ and $x_{2M}(n)$ of the plant model by the equation (41) using the input u(n), the system-matrix mat A, and the input matrix mat B. The state variable mat $x_M(n)$ of the plant model is fixed according to the state quantities $x_{1M}(n)$ and $x_{2M}(n)$.

In a following step S57, the controller 11 calculates the estimated state quantities $\hat{x}_1(n)$ and $\hat{x}_2(n)$ from the state variable mat x(n) of the controlled plant, the state variable mat $x_M(n)$ of the plant model, and the model dead time $d_M$ by the equations (49) and (50).

The estimated state variable mat $\hat{x}(n)$ is fixed according to the estimated state quantities $\hat{x}_1(n)$ and $\hat{x}_2(n)$.

After the processing of the step S57, the controller 11 terminates the routine.

The step S53 corresponds to the function of the model schedule unit 33 of FIG. 14. The steps S54 and S55 correspond to the function of the cylinder intake air-fuel ratio calculation unit 32 of FIG. 14. The step S56 corresponds to the function of the plant-model state-variable calculation unit 34 of FIG. 14. The step S57 corresponds to the function of the estimated state variable calculation unit 35 of FIG. 14.

The processing in the state estimation unit 31 is described below based on the state quantities in a practical manner.

The plant-model state-variable calculation unit 34 calculates a model air-fuel ratio which is an air-fuel ratio on the present occasion (n) matching with the present engine operation range, from the air-fuel ratio CYLAF of the air-fuel mixture in the combustion chamber 1A, which corresponds to the input u(n) of the plant model on the present occasion (n).

The estimated state variable calculation unit 35 calculates an estimated air-fuel ratio to be measured by the upstream air-fuel ratio sensor 16 in the upstream of the catalytic converter 7 after the model dead time $d_M$ from the present occasion (n), from the model air-fuel ratio CYLAF, and the air-fuel ratio detected by the air-fuel ratio sensor 16 on the present occasion (n) by applying the aforesaid combination of the Smith dead time compensation and disturbance compensation shown in FIG. 16.

Upon input of the estimated air-fuel ratio from the estimated state variable calculation unit 35, the switching function calculation unit 23 of the sliding mode control unit 22 calculates the switching function of the present occasion (n) based on the estimated air-fuel ratio and the target air-fuel ratio TGABF by the following equation (57) which replaces the aforesaid equation (8).

$$\sigma(n) = S_1 \cdot \{\hat{x}_1(n) - \theta_1(n)\} + S_2 \cdot \{\hat{x}_2(n) - \theta_2(n)\} = 0 \tag{57}$$

where,

σ(n)=state quantity, $S_1$=element of the switching function gain mat S, and $S_2$=element of the switching function gain mat S The linear input calculation unit 25 of the sliding mode control unit 22 calculates the linear input by the following equations (58) and (59) instead of the aforesaid equation (12).

$$\text{mat } u_{eq}(n) = -(\text{mat } S \cdot \text{mat } B)^{-1} \cdot \text{mat } S \cdot \{\text{mat } A \cdot \text{mat } \hat{x}(n) - \text{mat } \theta(n+1)\} - \sigma(n) \tag{58}$$

The following equation (59) is obtained by rewriting the equation (58) using scalar values given by the equations (48) and (57).

$$u_{eq}(n) = (S_1 \cdot b_1 + S_2 \cdot b_0)^{-1} \cdot \left(a_1 \cdot S_1 + a_0 \cdot S_2 + \frac{S_1^2}{S_2}\right) \cdot \{\hat{x}_1(n) - \theta_1(n)\} \tag{59}$$

When the operation range of the engine 1 varies from a range with a small model dead time $d_M$ to a range with a large model dead time $d_M$, the error in the estimated state quantity $\hat{x}_2(n)$ will increase.

Specifically, it has been experimentally proved that, if a delay compensation based on a large model dead time $d_M$ is applied to the air-fuel ratio that was calculated based on the fuel injection amount in the range with a small model dead time $d_M$, the air-fuel ratio will fluctuate. This phenomenon will further be described below.

The state quantity $x_2(n)$ and its target value $\theta_2(n)$ of the controlled plant, and the state quantity $x_{2M}(n)$ and the estimated state quantity $\hat{x}_2(n)$ of the plant model have the relation specified by the following equations (60)–(63).

$$\theta_2(n) = -a_0 \cdot \theta_1(n) + b_0 \cdot u(n-d_M-1) \quad (60)$$

$$x_2(n) = -a_0 \cdot x_1(n-1) + b_0 \cdot u(n-d_M-1) \quad (61)$$

$$x_{2M}(n) = -a_0 \cdot x_{1M}(n-1) + b_0 \cdot u(n-1) \quad (62)$$

$$\hat{x}_2(n) = x_2(n+d_M) = x_2(n) - x_{2M}(n-d_M) + x_{2M}(n) \quad (63)$$

The equations (60)–(62) are obtained as follows.

Since $y(n) = x_1(n)$ holds from the equation (40), the target output value $\theta_1(n)$ is also the target value of the state quantity $x_1(n)$. By expanding the equation (39), the following equations (64) and (65) are obtained.

$$x_1(n+1) = -a_1 \cdot x_1(n) + x_2(n) + b_1 \cdot u(n-d) \quad (64)$$

$$x_2(n+1) = -a_0 \cdot x_1(n) + b_0 \cdot u(n-d) \quad (65)$$

In the equation (65), if n+1 is replaced by n, the following equation (66) will be obtained.

$$x_2(n) = -a_0 \cdot x_1(n-1) + b_0 \cdot u(n-1-d) \quad (66)$$

The equation (66) differs from the equation (62) in that $x_2(n)$ includes dead time while $x_{2M}(n)$ does not include dead time.

In other words, the equation (62) is obtained by eliminating the dead time d form the equation (66).

The target value of the state quantity $x_2(n)$ is expressed by the following equation (67) in view of the equation (65).

$$\theta_2(n+1) = -a_0 \cdot \theta_1(n) + b_0 \cdot u(n-d) \quad (67)$$

If n+1 is replaced by n in the above equation (67) the following equation (68) will be obtained.

$$\theta_2(n) = -a_0 \cdot \theta_1(n-1) + b_0 \cdot u(n-d-1) \quad (68)$$

Since the relation $\theta_1(n) = \theta_1(n-1)$ holds, the following equation (60) is obtained from the equation (68).

FIGS. 19A–19G show an example where the model dead time $d_M$ varies from two to three due to the reduction of the cylinder intake air amount Qc, and the target value thets$_2(n)$ of the state quantity decreases accordingly. It is assumed that the input u(n) of the plant model does not change.

In this case, in accordance with the reduction of the target value $\theta_2(n)$, both the state quantities $x_2(n)$ and $x_{2M}(n)$ decrease.

The estimated state quantity $\hat{x}_2(n)$ is calculated at the timing when the model dead time $d_M$ changes from two to three by the following equation (69) that is obtained from the equation (63).

$$\hat{x}_2(n) = x_2(n) - x_{2M}(n-3) + x_{2M}(n) \quad (69)$$

The equation (69) estimates, in the present cycle n, a state quantity $x_2(n+3)$ of a cycle n+3.

Figure 19:
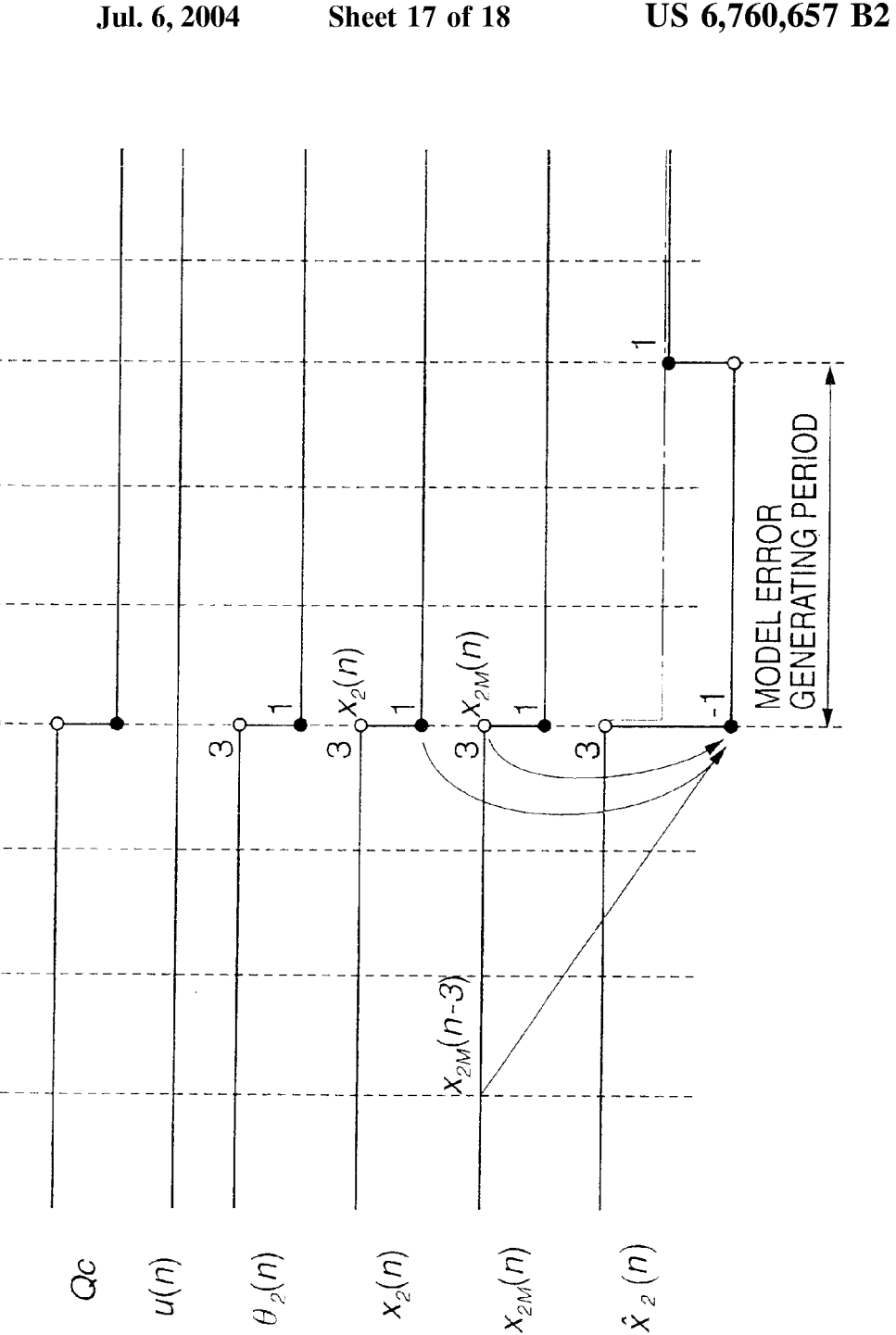
FIGS. 19A–19G are timing charts describing a variation of a state quantity $\hat{x}_2(n)$ of the estimated state variable accompanying change-over of the model dead time $d_M$.

It is assumed that the state quantities $x_2(n)$ and $x_{2M}(n)$ decrease from three to unity in the present cycle n as shown in FIGS. 19D and 19E.

Accordingly, both the state quantities $x_2(n)$ and $x_{2M}(n)$ are unity in the present cycle n. The state quantity $x_{2M}(n-3)$ is a state quantity of the cycle n−3 and is equal to three. Therefore, the equation (69) in the present cycle n is calculated as follows.

$$\hat{x}_2(n) = 1 - 3 + 1 = -1 \quad (70)$$

This value of the estimated state quantity $\hat{x}_2(n)$ is smaller than the state quantity $x_2(n)$.

As shown in FIG. 19G, the state where the estimated state quantity $\hat{x}_2(n)$ is equal to negative unity continues until just before the cycle n+3, and the estimated state quantity $\hat{x}_2(n)$ becomes unity which is identical to the value of the state quantity $x_2(n)$ in the cycle n+3.

However, $\hat{x}_2(n)$ which is an estimated value of the state quantity is preferably equal to unity during the period from the cycle n to the cycle n+3 as shown by a dotted line in FIG. 19G. In other words, if the equation (63) is applied in this section to calculate the estimated state quantity $\hat{x}_2(n)$, an error will be generated. This error is hereinafter referred to as a model error.

In order to avoid the generation of the model error, the controller 11 prevents the equation (63) from being applied in the calculation of the estimated state quantity $\hat{x}_2(n+d_M)$ until the model dead time $d_M$ has elapsed after the increase of the model dead time $d_M$, and sets the $\hat{x}_2(n+d_M)$ equal to the state quantity $x_2(n)$. It can be said that the controller 11 prevents the compensation of disturbance and dead time from being applied to the air-fuel ratio control during this period.

Figure 20:
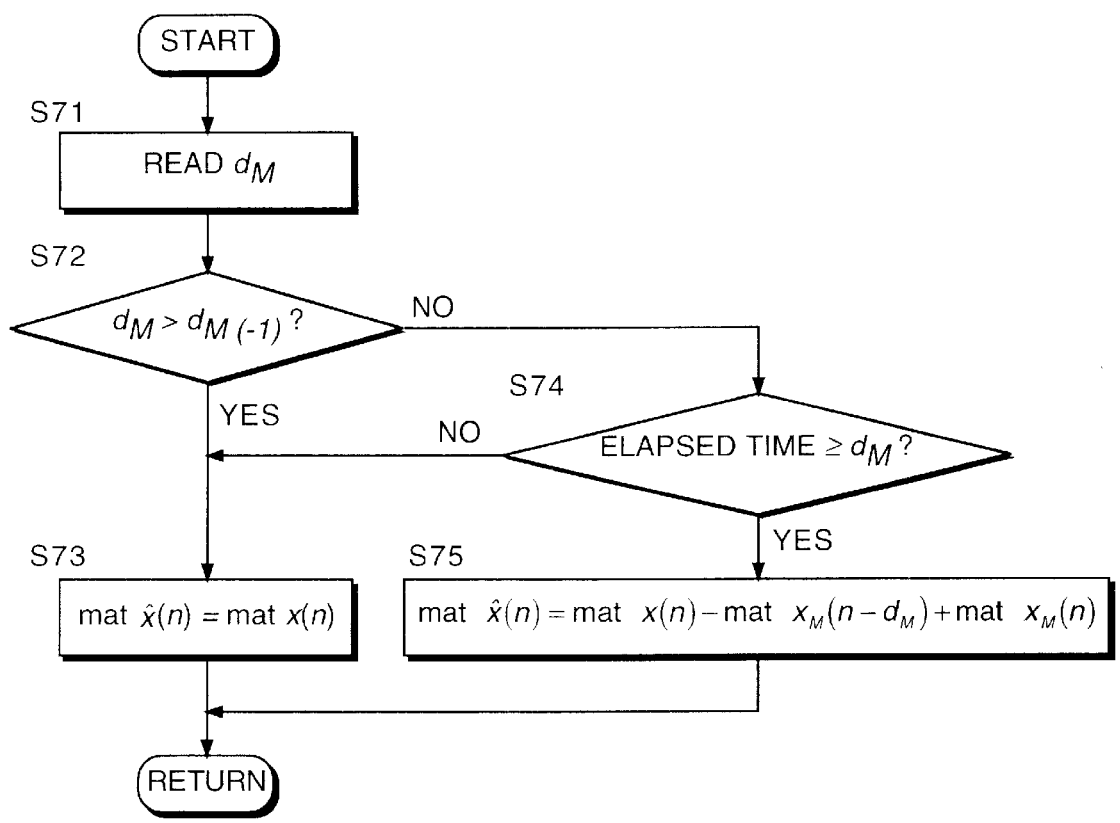
FIG. 20 is a flowchart describing a subroutine for calculating the estimated state variable during the model dead-time change-over performed by the controller.

The controller 11 preforms the above processing in the step S57 using a subroutine of FIG. 20.

Referring to FIG. 20, in a step S71, the controller 11 first reads the model dead time $d_M$ that was found in the step S63 of the subroutine of FIG. 18.

In a following step S72, the controller determines if the model dead time $d_M$ is larger than the value that was applied in the immediately preceding occasion when the subroutine was executed.

If the model dead time $d_M$ is larger than the immediately preceding value, the controller 11, in a step S73, sets the estimated state variable mat $\hat{x}(n)$ to be equal to the state variable mat x(n). In other words, the estimated state quantity $\hat{x}_2(n)$ is set equal to the state quantity $x_2(n)$.

If the model dead time $d_M$ not larger than the immediately preceding value, the controller 11, in a step S74, determines if the elapsed time after the model dead time $d_M$ increase is larger than the model dead time $d_M$.

In other words, the controller 11 determines if the present occasion corresponds to the model error generation period of FIG. 19G.

If the elapsed time does not reach the model dead time $d_M$, the controller preforms the processing of the step S73 to maintain the estimated state variable mat $\hat{x}(n)$ to be equal to the state variable mat x(n).

If the elapsed time has reached the model dead time $d_M$, the controller 11 calculates the estimated state variable mat $\hat{x}(n)$ by applying the aforesaid combination of the Smith dead time compensation and disturbance compensation by the equation (63).

After the processing of the step S73 or step S75, the controller 11 terminates the subroutine.

The above air-fuel ratio control according to this invention is summarized as follows.

The controller 11 compensates the dead time from when the air-fuel ratio is determined by the fuel injection until it is detected by the upstream air-fuel ratio sensor 16, by applying the combination of the Smith dead time compensation and disturbance compensation. The controller 11 then feedback controls the fuel injection amount through the sliding mode control process such that the air-fuel ratio after compensation is equal to the target air-fuel ratio.

The state estimation unit 31 approximates the dynamic characteristic of the exhaust gas flow of the engine 1 and that of the upstream air-fuel ratio sensor 16 by the transfer function of a secondary discrete system which has dead time. The transfer function is identified by the application of an ARX model.

Due to this process, the transfer function of the secondary discrete system with dead time is converted to the state equations that represent the controlled plant.

On the other hand, the dynamic characteristic of the exhaust gas flow of an imaginative engine without dead time and that of an imaginative upstream air-fuel ratio sensor without dead time are approximated by the transfer function of a secondary discrete system without dead time. The transfer function is identified by the application of an ARX model.

Due to this process, the transfer function of the secondary discrete system without dead time is converted to the state equations that represent the plant model. Furthermore, a state equation to which the Smith dead time compensation and disturbance compensation are applied is obtained based on the state variable mat $x(n)$ representing the controlled plant with dead time, the state variable mat $x_M(n)$ representing the plant model without dead time, and the model dead time $d_M$.

The sliding mode control unit 22 calculates the difference between the estimated state variable mat $\hat{x}(n)$ and the target value mat $\theta(n)$ of the state variable as the state quantity mat $e(n)$ of the error. Then it multiplies the state quantity mat $e(n)$ of the error by the switching function gain mat S to obtain the state quantity $\sigma(n)$ of the switching function.

Based on the state quantity $\sigma(n)$ of the switching function, the sliding mode control unit 22 calculates the nonlinear input $u_{nl}(n)$ and the linear input $u_{eq}(n)$, and it finally calculates the total control input $u_{sl}(n)$ by adding an integrated value of the linear input $u_{eq}(n)$ to the nonlinear input $u_{nl}(n)$. The fuel injection amount of the fuel injector 5 is controlled according to the total control input $u_{sl}(n)$.

Due to the above air-fuel control process according to this invention, in the air-fuel ratio control of the engine 1 which has dead time, the air-fuel ratio does not fluctuate even when the feedback gain is increased, so the feedback gain can be increased even in a range near the idle operation range of the engine 1 where the intake air amount is small and the dead time largely affects the air-fuel ratio control.

Although the individual difference in the performance of the fuel injector 5 or in the upstream air-fuel ratio sensor 16 brings an error to air-fuel ratio control, the effect of such an individual difference is eliminated by calculating the fuel injection pulse width TIPSCYL using the air-fuel ratio feedback correction value ALPHA and the learning value KBLRC thereof.

The dynamic characteristic of an air-fuel ratio varies with an engine load and engine rotation speed, and a large error will be generated, if a single state equation is applied over the whole operation ranges of the engine 1.

The air-fuel ratio control according to this invention selectively applies a state equation of the secondary discrete plant model without dead time from among the plural equations set according to cylinder intake air amount Qc that represents the engine load and engine rotation speed.

Therefore, in all operation ranges, the optimal state equation of the secondary discrete plant model without dead time can be used.

As a result, even when performing air-fuel ratio feedback control at a fixed time interval, a desirable control response is realized all over the operating range irrespective of the number of combustions per unit time of the engine 1.

Since the controller 11 according to this invention calculates the model dead time $d_M$ according to the cylinder intake air amount Qc, the model dead time $d_M$ is quite close to the real dead time incorporated in the air-fuel ratio control of the engine 1.

If Smith method for dead time compensation is applied when the model dead time $d_M$ has increased, the air-fuel ratio feedback correction amount may be excessively large and the air-fuel ratio may fluctuates as a result.

The controller 11 according to this invention prevents Smith dead time compensation and the disturbance compensation from being performed from when the model dead time $d_M$ is increased until when the elapsed time after the increase of the model dead time $d_M$ reaches the increased model dead time $d_M$.

Therefore, even when the model dead time $d_M$ increases, the air-fuel ratio fluctuation due to excessive feedback correction will not occur.

The controller 11 according to this invention selectively applies a different transfer function Geng(q) of the secondary discrete system according to the operation range of the engine 1. For this purpose, various transfer functions Geng(q) are previously identified through the process of the step response in various operation ranges. The controller 11 performs air-fuel ratio feedback control by applying a sliding mode control process based on the state equation of the secondary discrete system converted from the selected transfer function Geng(q).

Therefore, a plant model can be built with more accuracy than that built with the prior art technique which computes the state equation for the sliding mode control process from a physical model of continuous system.

Moreover, the responsibility and robustness of control improve compared with classic control like three element control.

The sliding mode control process increases the response in the air-fuel ratio control as well as its robustness compared with a classic control process such as a proportional/integral/derivative (PID) control process. Since the switching function is uniquely identified by step response measurement, the switching function as well as the linear input for the sliding mode control process can be designed easily.

According to this invention, the total control input $u_{sl}(n)$ is calculated based on the integral value of the linear input $u_{eq}(n)$ that was calculated by the integrator 26. Compared with the case where it is calculated directly from the linear input $u_{eq}(n)$, this process eliminates a steady state error while maintaining the control response at a preferred level.

If a large control input is given to the fuel injector 5 in order to accelerate the convergence of the air-fuel ratio to the target air-fuel ratio, the drivability of the vehicle as well as the exhaust emission of the engine 1 may deteriorate. To avoid such a situation, it is required to determine the switching function gain mat S and the integration gain $\mu$ according to the operation range of the engine 1.

The controller 11 according to this invention first calculates the integration gain $\mu$ according to the rotation speed of the engine 1 and then determines the switching function gain mat S using the equation (29), so the design of the switching function is easy.

When the feedback control of the fuel injection amount is performed at fixed time intervals, the number of fuel injections per unit time increases as the rotation speed of the engine 1 increases, and the apparent feedback gain decreases.

As a result, the trackability to the target value of the air-fuel ratio in a high rotation speed range may not be as good as in a low rotation speed range.

Since the controller 11 according to this invention calculates the integration gain $\mu$ according to the engine rotation speed, even when the feedback control of the air-fuel ratio is performed at fixed time intervals, decrease in the apparent integration gain does not occur and the optimal integration gain is obtained all over the engine operation range.

The controller 11 according to this invention, switches the sign of the element $S_2$ of the switching function gain mat S according to the sign of the element $a_0$, which represents the state of the system matrix mat A, so the air-fuel ration is always corrected in the right direction even in the case where the state of the system matrix has varied.

The contents of Tokugan 2001-224162, with a filing date of Jul. 25, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the above embodiment is related with an air-fuel ratio control using a state equation having two inputs and two outputs, but this invention is also applicable to an air-fuel ratio control using a state equation of other type.

In the above embodiment, although the target air-fuel ratio is varied, this invention is applicable to the engine which is operated with a fixed target air-fuel ratio such as the stoichiometric air-fuel ratio as long as it performs air-fuel ratio feedback control.

The embodiments of this invention in which an exclusive property or privilege is claimed are defined as follows:

1. An air-fuel ratio control device for an engine with a combustion chamber for burning a mixture of air and fuel, comprising:
    a fuel injector which injects fuel in the engine to generate the mixture;
    a sensor which detects an air-fuel ratio of the mixture from a composition of exhaust gas of the engine; and
    a programmable controller programmed to:
        calculate a dead time which represents a lag between the variation of air-fuel ratio of the mixture in the combustion chamber and the variation of air-fuel ratio which is detected by the sensor;
        calculates an estimated state quantity by applying a dead time compensation according to Smith method and a disturbance compensation to the air-fuel ratio detected by the sensor;
        calculate an air-fuel ratio feedback correction amount based on the estimated state quantity and a predetermined target air-fuel ratio through a sliding mode control process; and
        control a fuel injection amount of the fuel injector based on the air-fuel ratio feedback correction amount.

2. The air-fuel ratio control device as defined in claim 1, wherein the controller is further programmed to perform the disturbance compensation using a disturbance compensator which has a transfer function equal to unity.

3. The air-fuel ratio control device as defined in claim 1, wherein the controller is further programmed to:
    calculate a first state variable of the engine as a controlled plant from the air-fuel ratio detected by the sensor;
    calculate an intake air amount to the combustion chamber from the fuel injection amount of the fuel injector;
    determine a system matrix, an input matrix and a dead time based on the intake air amount;
    calculate the air-fuel ratio of the mixture in the combustion chamber from the intake air amount, as an input;
    calculate a second state variable of the engine as a plant model from the input, the system matrix and the input matrix; and
    calculate an estimated state variable of the engine as the controlled plant in a state where the dead time has elapsed from the first state variable, the second state variable and the dead time by applying the dead time compensation according to Smith method and the disturbance compensation.

4. The air-fuel ratio control device as defined in claim 1, wherein the controller is further programmed to calculate a difference between the estimated state variable and a target state variable as a state quantity of an error, calculate a state quantity of the switching function based on the state quantity of the error, calculate an linear input based on the state quantity of the error, calculate a nonlinear input based on the state quantity of the switching function, calculate a total control input by adding an integrated value of the linear input to the nonlinear input, and calculate the air-fuel ratio feedback correction amount by converting the total control input.

5. The air-fuel ratio control device as defined in claim 3, wherein the first state variable is defined by a state equation which defines the controlled plant as a secondary discrete system which has a dead time.

6. The air-fuel ratio control device as defined in claim 3, wherein the second state variable is defined by a state equation which defines the plant model as a secondary discrete system which does not have a dead time.

7. The air-fuel ratio control device as defined in claim 3, wherein the controller is further programmed to increase the dead time as the intake air amount becomes smaller.

8. The air-fuel ratio control device as defined in claim 7, wherein the controller is further programmed to determine if the dead time has increased, and prevent the dead time compensation according to Smith method and the disturbance compensation from being performed during a period from the timing of increase of the dead time until the dead time has elapsed.

9. The air-fuel ratio control device as defined in claim 3, wherein the controller is further programmed to repeatedly perform the calculation of the air-fuel ratio feedback correction amount and the control of the fuel injection amount based on the air-fuel ratio feedback correction amount at fixed time intervals and calculate the intake air amount based on the fuel injection amount calculated from the most recent value of the air-fuel ratio feedback correction value.

10. The air-fuel ratio control device as defined in claim 3, wherein the controller is further programmed to calculate the estimated state variable by applying the dead time compensation according to Smith method and the disturbance compensation defined by the following equation (A):

$$\text{mat } \hat{x}(n) = \text{mat } x(n + d_M) \qquad (A)$$
$$= \text{mat } x(n) - \text{mat } x_M(n - d_M) + \text{mat } x_M(n)$$

where, $d_M$=dead time, mat $\hat{x}(n)$=matrix representing the estimated state variable, mat $x(n)$=matrix representing the first state variable, mat $x_M(n)$=matrix representing the second state variable, and mat $x_M(n-d_M)$=matrix representing the state variable of the plant model after the dead time $d_M$ has elapsed.

11. An air-fuel ratio control device for an engine with a combustion chamber for burning a mixture of air and fuel, comprising:

means for injecting fuel in the engine to generate the mixture;

means for detecting an air-fuel ratio of the mixture from a composition of exhaust gas of the engine;

means for calculating a dead time which represents a lag between the variation of air-fuel ratio of the mixture in the combustion chamber and the variation of air-fuel ratio which is detected by the detecting means;

means for calculating an estimated state quantity by applying a dead time compensation according to Smith method and a disturbance compensation to the air-fuel ratio detected by the detecting means;

means for calculating an air-fuel ratio feedback correction amount based on the estimated state quantity and a predetermined target air-fuel ratio through a sliding mode control process; and means for controlling a fuel injection amount of the injecting means based on the air-fuel ratio feedback correction amount.

12. An air-fuel ratio control method for an engine with a combustion chamber for burning a mixture of air and fuel, and a fuel injector which injects fuel in the engine to generate the mixture, the method comprising:

detecting an air-fuel ratio of the mixture from a composition of exhaust gas of the engine;

calculating a dead time which represents a lag between the variation of air-fuel ratio of the mixture in the combustion chamber and the variation of a detected air-fuel ratio;

calculating an estimated state quantity by applying a dead time compensation according to Smith method and a disturbance compensation to the detected air-fuel ratio;

calculating an air-fuel ratio feedback correction amount based on the estimated state quantity and a predetermined target air-fuel ratio through a sliding mode control process; and controlling a fuel injection amount of the fuel injector based on the air-fuel ratio feedback correction amount.

* * * * *